(12) United States Patent
Tsunai

(10) Patent No.: US 7,196,303 B2
(45) Date of Patent: Mar. 27, 2007

(54) CCD IMAGE SENSOR

(75) Inventor: Shiro Tsunai, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 277 days.

(21) Appl. No.: 10/724,258

(22) Filed: Dec. 1, 2003

(65) Prior Publication Data

US 2004/0109075 A1 Jun. 10, 2004

(30) Foreign Application Priority Data

Nov. 29, 2002 (JP) ............................. 2002-347723

(51) Int. Cl.
*H01L 27/00* (2006.01)
*H04N 5/335* (2006.01)

(52) U.S. Cl. .................................. 250/208.1; 348/311
(58) Field of Classification Search ............. 250/208.1; 348/294, 298, 303
See application file for complete search history.

(56) References Cited

U.S. PATENT DOCUMENTS

| | | | | | |
|---|---|---|---|---|---|
| 5,379,067 | A | * | 1/1995 | Miura | 348/311 |
| 5,767,901 | A | * | 6/1998 | Kimura | 348/272 |
| 5,801,373 | A | * | 9/1998 | Oozu et al. | 250/208.1 |
| 6,333,525 | B1 | * | 12/2001 | Furumiya | 257/215 |
| 2003/0132367 | A1 | * | 7/2003 | Suzuki et al. | 250/208.1 |
| 2003/0209744 | A1 | * | 11/2003 | Futamura | 257/294 |

FOREIGN PATENT DOCUMENTS

| | | |
|---|---|---|
| JP | 64-14966 | 1/1989 |
| JP | 1-248665 | 10/1989 |
| JP | 4-14842 | 1/1992 |
| JP | 10-233883 | 9/1998 |
| JP | 11-164087 | 6/1999 |
| JP | 11-205532 | 7/1999 |
| JP | 2001-203342 | 7/2001 |

OTHER PUBLICATIONS

Chinese Office Action dated Feb. 25, 2005, with English translation.

* cited by examiner

*Primary Examiner*—Georgia Epps
*Assistant Examiner*—Kevin Wyatt
(74) *Attorney, Agent, or Firm*—McGinn IP Law Group, PLLC

(57) ABSTRACT

A CCD image sensor includes a first diode row comprised of photodiodes arranged in a row, a second diode row extending in parallel with the first diode row and comprised of photodiodes arranged in a row, photodiodes in the second diode row being staggered by a half pitch relative to photodiodes in the first diode row, a first charge transfer device transferring signal charges received from K-th photodiodes in the first diode row wherein K is an odd number, a second charge transfer device transferring signal charges received from L-th photodiodes in the first diode row wherein L is an even number, a third charge transfer device transferring signal charges received from K-th photodiodes in the second diode row, a fourth charge transfer device transferring signal charges received from L-th photodiodes in the second diode row, a charge-detecting capacitor receiving signal charges at different timings from one another from the first to fourth charge transfer devices, and a charge-detector detecting signal charges stored in the charge-detecting capacitor.

20 Claims, 19 Drawing Sheets

FIG.16
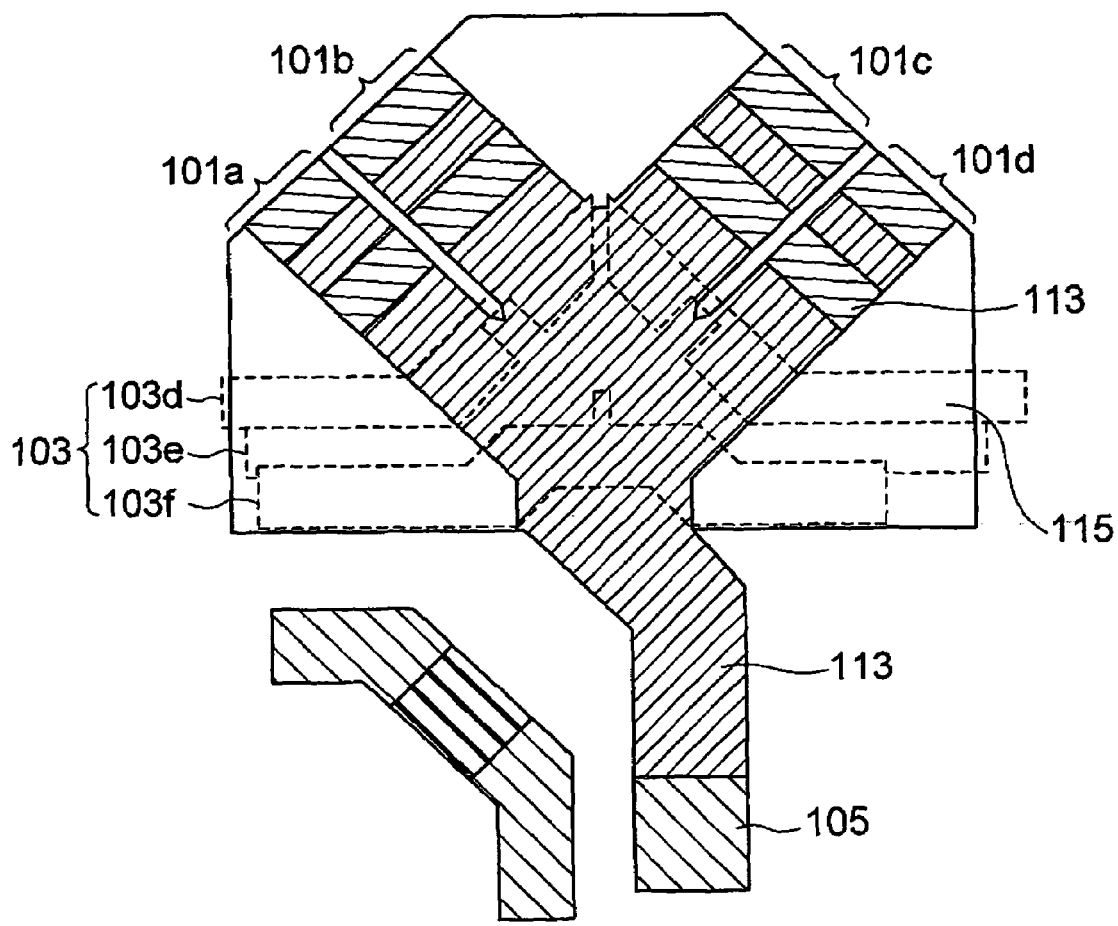
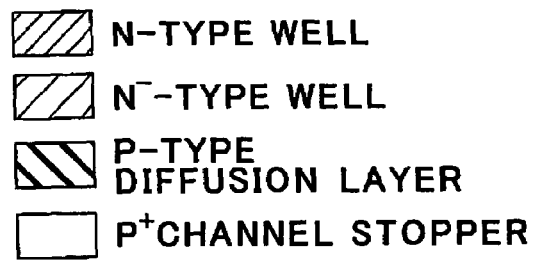

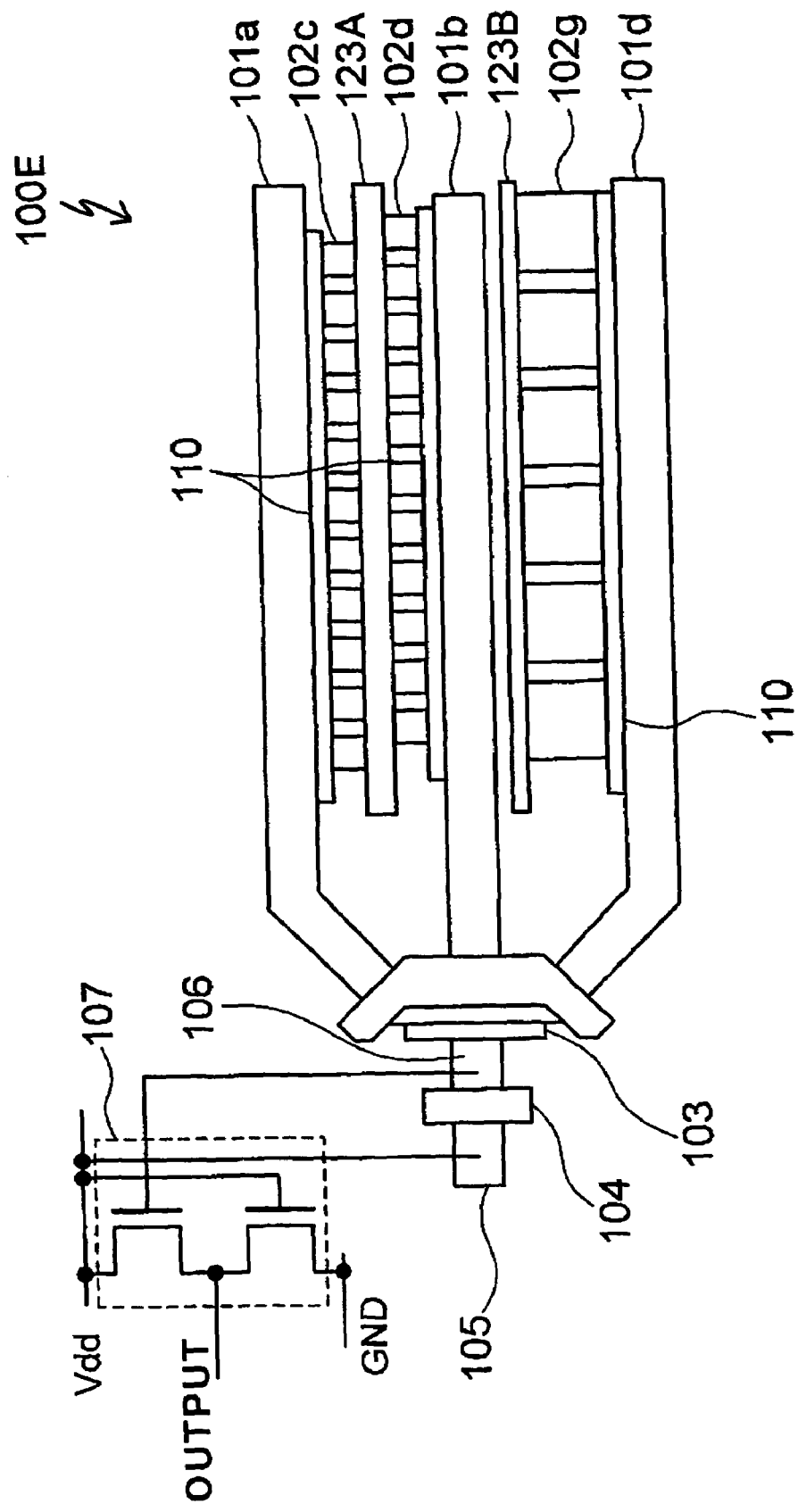

CCD IMAGE SENSOR

BACKGROUND OF THE INVENTION

1. Field of the Invention

The invention relates to a CCD (charge-coupled device) image sensor, and more particularly to a CCD image sensor in which signal charges received from a plurality of charge transfer devices are input into a charge-detecting capacitor to which the charge transfer devices are connected.

2. Description of the Related Art

A CCD image sensor including a plurality of charge transfer devices is recently required to include photodiodes fabricated in a smaller size and have a higher resolution. In order to fabricate photodiodes in a smaller size, it is necessary to fabricate a charge transfer device in a smaller size. However, it would take much time and cost for doing so, and hence, it is quite difficult to accomplish fabrication of a charge transfer device in a smaller size in response to requirement of fabrication of a photodiode in a smaller size. Hence, a photodiode has been conventionally fabricated small and the number of photodiodes has been conventionally increased without fabrication of a charge transfer device in a smaller size, as follows.

FIG. 1 is a view of a conventional CCD image sensor.

The illustrated CCD image sensor 200A is of a single CCD type. Specifically, the CCD image sensor 200A includes a photodiode row 202 comprised of a plurality of photodiodes arranged in a line, and charge transfer devices 201 arranged in a line in facing relation with the photodiode row 202. Each of the photodiodes in the photodiode row 202 outputs signal charges to the charge transfer device 201 through a reading gate 210.

The photodiodes in the photodiode row 202 are arranged at a 8 micrometer pitch, for instance, and the charge transfer devices 201 are fabricated in accordance with a pitch of the photodiode row 202. A signal is applied to a charge-transfer electrode (not illustrated) in each of the charge transfer devices 201, and resultingly, charges having been ejected from the photodiodes are transferred to an output gate 203 through the charge transfer devices 201. Charges pass through the output gate 203, a charge-detecting capacitor 206 and a source follower circuit 207, and then, are output from the CCD image sensor 200A as output signals.

FIG. 2 is a view of another conventional CCD image sensor which is of a dual CCD type, suggested in Japanese Patent Application Publications Nos. 11-164087 and 1-248665.

The illustrated CCD image sensor 200B includes charge transfer devices 201a and 201b outside a photodiode row 202. The photodiode row 202 includes a first group of photodiodes which eject charges to the charge transfer devices 201a and a second group of photodiodes which eject charges to the charge transfer devices 201b. The photodiodes in the first group and the photodiodes in the second group are alternately arranged at a certain pitch, for instance, at a 4 micrometer pitch. The charge transfer devices 201a or 201b may be arranged at a pitch equal to a pitch at which the charge transfer devices 201 illustrated in FIG. 1 are arranged.

The photodiode row 202 ejects charges to the charge transfer devices 201a and 201b through reading gates 210. The thus ejected charges are transferred through the charge transfer devices 201a and 201b, and alternately input into a common output gate 203.

The output gate 203, a charge-detecting capacitor 206 and a source follower circuit 207 may be arranged for each of the charge transfer devices 201a and 201b for independently outputting charges transferred through the charge transfer devices 201a and 201b. However, the CCD image sensor would be necessary to include a switch for allowing the charges transferred through the charge transfer devices 201a and 201b to be output.

The CCD image sensor 200B is designed to have the output gate 203 acting as a common output gate for the charge transfer devices 201a and 201b so as to omit such a switch as mentioned above.

The dual CCD type CCD image sensor 200B can have photodiodes in the number twice greater than the single CCD type CCD image sensor 200A by including charge transfer devices fabricated in accordance with a process identical with a process in accordance with which the charge transfer device 201 in the single CCD type CCD image sensor 200A is fabricated, and having the same length as that of the charge transfer device 201. That is, a dual CCD type CCD image sensor can have photodiodes in the doubled number relative to a single CCD type CCD image sensor without fabricating charge transfer devices in a small size. Fabrication of a photodiode in a small size is not so difficult in comparison with fabrication of a charge transfer device in a small size.

FIG. 3 is a view of another conventional CCD image sensor including two photodiodes arranged in staggered arrangement, suggested in Japanese Patent Application Publication No. 2001-203342.

The illustrated CCD image sensor 200C includes first and second charge transfer devices 201a and 201b in facing relation to first and second photodiode rows 202a and 202b. Photodiodes in the first diode row 202a and photodiodes in the second diode row 202b are staggered by a half pitch to each other.

The CCD image sensor 200C is designed to have two single CCD type CCD image sensors 200A (see FIG. 1) arranged such that photodiodes in two photodiode rows are staggered by a half pitch, and further have a common output gate 203 through which signals are output. Such a structure allows the CCD image sensor 200C to have photodiodes in the number twice greater than the single CCD type CCD image sensor 200A without necessity of fabricating a charge transfer device in a small size, similarly to the dual CCD type CCD image sensor 200B.

In the dual CCD type CCD image sensor 200B and the CCD image sensor 200C including photodiodes arranged in staggered arrangement, it is possible to set a frequency of a signal applied to a charge-transfer electrode in a charge transfer device, equal to a half of a frequency of the same in the single CCD type CCD image sensor 200A under condition that charges are ejected from photodiodes in the common number and in a common period of time. This ensures prevention of electromagnetic interference (EMI).

In addition, the CCD image sensor 200C has advantages relative to the dual CCD type CCD image sensor 200B that a photodiode can be fabricated in a larger size, ensuring a higher signal-to-noise (SIN) ratio and a broader dynamic range.

FIG. 4 is a view of another conventional CCD image sensor including four photodiodes arranged in staggered arrangement, and FIG. 5 is a view of still another conventional CCD image sensor including four photodiodes arranged in staggered arrangement.

Each of the CCD image sensor 200D illustrated in FIG. 4 and the CCD image sensor 200E illustrated in FIG. 5 includes four photodiode rows 202a to 202d wherein photodiodes in the photodiode rows 202a to 202d are staggered by a quarter pitch relative to one another, and presents photodiodes in the number twice greater than the CCD image sensors illustrated in FIGS. 2 and 3.

The CCD image sensor 200D illustrated in FIG. 4 includes two rows of charge transfer devices 201a and 201b. The first and second photodiode rows 202a and 202b are commonly connected to the charge transfer device 201a, and the third and fourth photodiode rows 202c and 202d are commonly connected to the charge transfer device 201b.

For instance, when one of the photodiode rows 202a and 202b both connected to the charge transfer devices 201a ejects charges into the charge transfer device 201a, in other words, when one of the photodiode rows 202a and 202b uses the charge transfer device 201a, charges ejected from the other of the photodiode rows 202a and 202b are exhausted through a charge-drainer 223a or 223b. The same is applied to the third and fourth photodiode rows 202c and 202d. Thus, if the first and fourth photodiode rows 202a and 202d use the charge transfer devices 201a and 201b, charges ejected from the second and third photodiode rows 202b and 202c are exhausted through a charge-drainer 223b.

In the CCD image sensor 200D, charges ejected from the photodiode rows 202a to 202d are separately output twice.

In the CCD image sensor 200E illustrated in FIG. 5, output signals transmitted from two dual CCD type CCD image sensors are switched by a switch 214. In the CCD image sensor 200E, charges ejected from one of the first and second photodiode rows 202a and 202b and charges ejected from one of the third and fourth photodiode rows 202c and 202d are input at the same timing into associated charge-detecting capacitors 206a and 206b. Hence, the CCD image sensor 200E is necessary to include a switch such as the switch 214. However, since it is not necessary separately output twice charges ejected from the photodiode rows 202a to 202d, it would be possible to shorten a period of time necessary for outputting signals, in comparison with the CCD image sensor 200D illustrated in FIG. 4.

As mentioned above, a CCD image sensor including four photodiodes arranged in staggered arrangement is advantageous for increasing the number of photodiodes, but is accompanied with problems that charges have to be ejected from photodiodes twice or half by half, and that signals have to be switched by means of the switch 214. These are because charges transferred through the four rows of charge transfer devices cannot be input into a common charge-detecting capacitor.

Japanese Patent Application Publication No. 10-233883 has suggested a CCD image sensor designed to output charges having been transferred through each of three or more charge transfer devices, through a common charge-detecting capacitor. In the suggested CCD image sensor, charges ejected from three photodiode rows associated with red (R), green (G) and blue (B) are output through a common charge-detecting capacitor. Signals for each of the colors are amplified in a common amplifier to thereby reduce linearity error in color images.

FIG. 6 is a block diagram of a color CCD image sensor suggested in the above-mentioned Publication.

The illustrated color CCD image sensor 300 includes photodiodes 312R, 312G and 312B for RGB colors, CCD shift registers 310R, 310G and 310B for RGB colors, and output gates 313R, 313G and 313B for RGB colors.

Charges ejected from the photodiodes 312R, 312G and 312B are transferred to the output gates 313R, 313G and 313B through the CCD shift registers 310R, 310G and 310B.

Two phase driven signals φ1 and φ2 are applied commonly to the shift registers 310R, 310G and 310B, and gate control signals Rog, Gog and Bog are applied to the output gates 313R, 313G and 313B, respectively. Charges transferred through any one of the output gates 313R, 313G and 313B are input into a floating source 314 as a charge-detecting capacitor which is common to red, green and blue. Charges having been input into the floating source 314 are output to an amplifier (not illustrated) through a source follower circuit 318. Thus, signals for each of the colors can be amplified by means of a common amplifier without using a switch, ensuring reduction in linearity error in color images.

However, the CCD image sensor suggested in the above-mentioned Publication is accompanied with a problem that photodiodes cannot be arranged in a high density, because arrangement of photodiodes is identical with the photodiode arrangement in a single CCD type CCD image sensor illustrated in FIG. 1. In addition, it is unavoidable that a channel length from each of the shift registers 310R, 310G and 310B to the floating source 314 is lengthy. Hence, when charges having been transferred through the shift registers 310R, 310G and 310B are input into the floating source 314, charges can hardly be transferred an area located just below the output gates 313R, 313G and 313B.

In general, charges transferred through a plurality of charge transfer devices are output through a common charge-detecting capacitor, a P$^+$ diffusion layer is formed extending to an area just below an output gate in order to prevent charges transferred through a plurality of charge transfer devices from being mixed with one another. That is, charge transfer devices are separated from one another even at an area just below output gates. However, this is accompanied with a problem that since an area at which charges join with one another becomes narrower in width at a location closer to a charge-detecting capacitor, a path through which charges are transferred is made narrow due to a P$^+$ diffusion layer, and hence, a P$^+$ diffusion layer is close to an adjacent P$^+$ diffusion layer, resulting in narrow-channel effect. If narrow-channel effect is caused, a potential is lowered, and hence, mobility speed of charges is reduced.

Japanese Patent Application Publication No. 11-205532 has suggested a solid-state image sensor including first, second and third photodiode rows. Shift electrodes and CCD registers are located between the first and second photodiode rows and further between the second and third photodiode rows. Outside the first and third photodiode rows are arranged shift electrodes and CCD registers.

Japanese Patent Application Publication No. 64-14966 has suggested a charge transfer device including a charge-transfer electrode and an output gate electrode both formed in a semiconductor substrate having a first conductivity. A charge-detecting region having a second conductivity is formed in the semiconductor substrate just below the output gate electrode. A charge-transfer channel located just below the charge-transfer electrode is narrowed towards the charge-detecting region. A stepped potential is formed below the charge-transfer electrode.

Japanese Patent Application Publication No. 4-14842 has suggested a charge-detecting circuit in a charge transfer device, including two rows of charge transfer registers, a floating diffusion type charge-reader which alternately reads out signal charges from final stages of the charge transfer registers, and an output gate located between the final stages of the charge transfer registers and the floating diffusion type charge-reader. Charges alternately read out of the final stages of the charge transfer registers are input into the floating diffusion type charge-reader through a single transfer channel formed below the output gate.

SUMMARY OF THE INVENTION

In view of the above-mentioned problems in the conventional CCD image sensors, it is an object of the present invention to provide a CCD image sensor which is capable of arranging photodiodes in a high density without fabrication of a charge transfer device in a small size, and further capable of improving deterioration in transfer of charges due to a lengthy channel length just below an output gate.

It is also an object of the present invention to provide a CCD image sensor which is capable of preventing narrow-channel effect caused by separation among charge transfer devices just below an output gate, and further capable of preventing reduction of a mobility speed of charges.

In one aspect of the present invention, there is provided a CCD image sensor including (a) at least four charge transfer devices each transferring signal charges in a column direction, (b) a charge-detecting capacitor receiving signal charges at different timings from one another from the charge transfer devices through an output gate to which the charge transfer devices are connected, and (c) a charge-detector detecting signal charges stored in the charge-detecting capacitor.

In the CCD image sensor, charges transferred through four or more charge transfer devices pass through an output gate common to the charge transfer devices at different timings from one another, and are input into a charge-detecting capacitor common to the charge transfer devices. An amount of charges input into a charge-detecting capacitor is detected by a charge-detector comprised of a source follower circuit, for instance, and then, output from the CCD image sensor as an output signal. By arranging small-sized photodiodes in association with the four or more charge transfer devices, it is possible to fabricate a photodiode in a small size without fabrication of a charge transfer device in a small size.

In a conventional CCD image sensor having four or more charge transfer devices, for instance, charges transferred through two rows of charge transfer devices are separately input into two or more charge-detecting capacitors, and then, output as an image output signal by switching charges transferred through two rows of charge transfer devices. However, even if each of the charge-detecting capacitors receives a same amount of charges therein, voltages of image output signals may be different from one another due to variance in sensitivity of the charge-detecting capacitors and reset noises. Such variance exerts harmful influence on reproducibility of images. The present invention makes it no longer necessary to have a switch for switching charges, and allows charges transferred through charge transfer devices to enter a common charge-detecting capacitor, ensuring reproducibility of images.

The CCD image sensor may further include a diode row extending between charge transfer devices located adjacent to each other, the diode row including a first group of photodiodes supplying signal charges to one of the charge transfer devices and a second group of photodiodes supplying signal charges to the other of the charge transfer devices, photodiodes belonging to the first group and photodiodes belonging to the second group being alternately arranged.

With respect to a pair of the charge transfer devices and a diode row, they are arranged in the same way as a dual CCD type CCD image sensor wherein signal charges are transferred along opposite sides of the photodiodes. By so arranging the photodiodes, it would be possible to fabricate a photodiode in a small size without fabricating a charge transfer device in a small size.

It is preferable that a first diode row extending between a pair of charge transfer devices and a second diode row extending between another pair of charge transfer devices are arranged at pitches different from each other.

Since the CCD image sensor may include four or more charge transfer devices, the CCD image sensor may include two or more dual CCD type CCD image sensor, in which case, photodiodes in the diode rows may be staggered from one another in a direction in which the photodiodes are arranged, ensuring a high density of photodiode arrangement.

The CCD image sensor may further include a first diode row and a second diode row both extending between charge transfer devices located adjacent to each other, wherein the first diode row supplies signal charges to one of the charge transfer devices and the second diode row supplies signal charges to the other of the charge transfer devices, and photodiodes in the first diode row and photodiodes in the second diode row are staggered by a half pitch.

With respect to a pair of charge transfer devices and the two diode rows, they are arranged in the same way as a staggered photodiode-arrangement of two photodiodes. By so arranging the photodiodes, it would be possible to fabricate a photodiode in a small size without fabricating a charge transfer device in a small size.

It is preferable that two diode rows extending between a pair of charge transfer devices and two diode rows extending between another pair of charge transfer devices are arranged at pitches different from each other.

Since the CCD image sensor may include four or more charge transfer devices, the CCD image sensor may include two or more staggered photodiode-arrangements of two photodiodes, in which case, photodiodes in the diode rows may be staggered from one another in a direction in which the photodiodes are arranged, ensuring a high density of photodiode arrangement.

There is further provided a CCD image sensor including (a) first, second and third charge transfer devices each transferring signal charges in a column direction, (b) a first diode row extending between the first and second charge transfer devices, the first diode row including a first group of photodiodes supplying signal charges to the first charge transfer device and a second group of photodiodes supplying signal charges to the second charge transfer device wherein photodiodes belonging to the first group and photodiodes belonging to the second group are alternately arranged, (c) a second diode row extending between the second and third charge transfer devices, the second diode row including a third group of photodiodes supplying signal charges to the second charge transfer device and a fourth group of photodiodes supplying signal charges to the third charge transfer device wherein photodiodes belonging to the third group and photodiodes belonging to the fourth group are alternately arranged, (d) a charge-detecting capacitor receiving signal charges at different timings from one another from the first to third charge transfer devices through an output gate to which the first to third charge transfer devices are connected, and (e) a charge-detector detecting signal charges stored in the charge-detecting capacitor.

In the above-mentioned CCD image sensor, the first diode row extends between the first and second charge transfer devices, and the second diode row extends between the second and third charge transfer devices. The first diode row includes a first group of photodiodes supplying signal charges to the first charge transfer device and a second group of photodiodes supplying signal charges to the second charge transfer device. The photodiodes in the first group and the photodiodes in the second group are alternately arranged. The second diode row includes a third group of photodiodes supplying signal charges to the second charge transfer device and a fourth group of photodiodes supplying signal charges to the third charge transfer device. The photodiodes in the third group and the photodiodes in the fourth group are alternately arranged. Charges transferred through the first to third charge transfer devices enter the output gate at different timings from one another, and are input into the charge-detecting capacitor. An amount of charges input into the charge-detecting capacitor is detected by the charge-detector comprised of a source follower circuit, for instance, and then, output from the CCD image sensor as an output signal. The first and second diode rows can include photodiodes having a small size, and hence, it would be possible to reduce a size of a photodiode without fabricating a charge transfer device in a small size.

There is still further provided a CCD image sensor including (a) a first diode row comprised of photodiodes arranged in a row, (b) a second diode row extending in parallel with the first diode row and comprised of photodiodes arranged in a row, photodiodes in the second diode row being staggered by a half pitch relative to photodiodes in the first diode row, (c) a first charge transfer device transferring signal charges received from K-th photodiodes in the first diode row wherein K is an odd number, (d) a second charge transfer device transferring signal charges received from L-th photodiodes in the first diode row wherein L is an even number, (e) a third charge transfer device transferring signal charges received from K-th photodiodes in the second diode row, (f) a fourth charge transfer device transferring signal charges received from L-th photodiodes in the second diode row, (g) a charge-detecting capacitor receiving signal charges at different timings from one another from the first to fourth charge transfer devices, and (h) a charge-detector detecting signal charges stored in the charge-detecting capacitor.

In the above-mentioned CCD image sensor, the first diode row extends between the first and second charge transfer devices, and the second diode row extends between the third and fourth charge transfer devices. The photodiodes in the second diode row are staggered by a half pitch relative to the photodiodes in the first diode row in a direction in which the photodiodes are arranged. Among the photodiodes in the second diode row, K-th photodiodes counted from the output gate supply charges to the third charge transfer device, and L-th photodiodes counted from the output gate supply charges to the fourth charge transfer device. Herein, K is an odd number, and L is an even number. Charges transferred through the first to fourth charge transfer devices enter the output gate at different timings from one another, and are input into the charge-detecting capacitor. An amount of charges input into the charge-detecting capacitor is detected by the charge-detector comprised of a source follower circuit, for instance, and then, output from the CCD image sensor as an output signal. The first and second diode rows can include photodiodes having a small size, and hence, it would be possible to reduce a size of a photodiode without fabricating a charge transfer device in a small size.

There is yet further provided a CCD image sensor including (a) a first diode row comprised of photodiodes arranged in a row, (b) a second diode row extending in parallel with the first diode row and comprised of photodiodes arranged in a row, photodiodes in the second diode row being staggered by a half pitch relative to photodiodes in the first diode row, (c) a third diode row comprised of photodiodes arranged in a row, photodiodes in the third row being staggered by a quarter pitch relative to photodiodes in the first diode row, (d) a fourth diode row extending in parallel with the third diode row and comprised of photodiodes arranged in a row, photodiodes in the fourth diode row being staggered by a quarter pitch relative to photodiodes in the second diode row, (e) first to fourth charge transfer devices transferring signal charged received from the first to fourth diode rows, respectively, (f) a charge-detecting capacitor receiving signal charges at different timings from one another from the first to fourth charge transfer devices, and (g) a charge-detector detecting signal charges stored in the charge-detecting capacitor.

In the above-mentioned CCD image sensor, the first and second diode rows extend between the first and second charge transfer devices, and the third and fourth diode rows extend between the third and fourth charge transfer devices. Photodiodes in the first diode row supply charges to the first charge transfer device, and photodiodes in the second diode row supply charges to the second charge transfer device. The photodiodes in the first and second diode rows are staggered by a half pitch relative to each other in a direction in which the photodiodes are arranged. Photodiodes in the third diode row supply charges to the third charge transfer device, and photodiodes in the fourth diode row supply charges to the fourth charge transfer device. The photodiodes in the third and fourth diode rows are staggered by a half pitch relative to each other in a direction in which the photodiodes are arranged. Hence, the photodiodes in the first and third diode rows are staggered by a quarter pitch relative to each other in a direction in which the photodiodes are arranged. Charges transferred through the first to fourth charge transfer devices enter the output gate at different timings from one another, and are input into the charge-detecting capacitor. An amount of charges input into the charge-detecting capacitor is detected by the charge-detector comprised of a source follower circuit, for instance, and then, output from the CCD image sensor as an output signal. The first and second diode rows can include photodiodes having a small size, and hence, it would be possible to reduce a size of a photodiode without fabricating a charge transfer device in a small size.

There is further provided a CCD image sensor including (a) a first diode row comprised of photodiodes arranged in a row, (b) a second diode row extending in parallel with the first diode row and comprised of photodiodes arranged in a row, photodiodes in the second diode row being staggered by a half pitch relative to photodiodes in the first diode row, (c) a third diode row extending in parallel with the first and second diode rows and comprised of photodiodes arranged in a row, photodiodes in the third row being arranged at a pitch twice greater than a pitch at which photodiodes in the first and second rows are arranged, (d) first to third charge transfer devices transferring signal charged received from the first to third diode rows, respectively, (f) a charge-detecting capacitor receiving signal charges at different timings from one another from the first to third charge transfer devices, and (g) a charge-detector detecting signal charges stored in the charge-detecting capacitor.

In the above-mentioned CCD image sensor, the first and second diode rows extend between the first and second charge transfer devices, and the third diode row faces the third charge transfer device. Photodiodes in the first diode row supply charges to the first charge transfer device, and photodiodes in the second diode row supply charges to the second charge transfer device. The photodiodes in the first and second diode rows are staggered by a half pitch relative to each other in a direction in which the photodiodes are arranged. Photodiodes in the third diode row supply charges to the third charge transfer device. The photodiodes in the third diode row may be designed to have a larger size than the photodiodes in the first and second rows, and may be arranged at a pitch longer than a pitch at which the photodiodes are arranged in the first and second diode rows. Charges transferred through the first to third charge transfer devices enter the output gate at different timings from one another, and are input into the charge-detecting capacitor. An amount of charges input into the charge-detecting capacitor is detected by the charge-detector comprised of a source follower circuit, for instance, and then, output from the CCD image sensor as an output signal. When it is necessary to read out images with a high resolution, output signals derived from charges ejected from the first and second diode rows may be used, when images may be read out with a low resolution, output signals derived from charges ejected from the third diode row may be used. In accordance with a resolution required when images are read out, a high or low resolution may be selected.

The CCD image may further include a first charge-drainer to which signal charges ejected from the first and second diode rows are drained, and a second charge-drainer to which signal charges ejected from the third diode row are drained, wherein one of the first and second charge-drains is activated.

A charge-drainer drains signal charges such that signal charges enter the output gate, and do not enter the charge-detecting capacitor. The first charge-drainer is associated with the first and second diode rows, and is located between the first and second diode rows, and the output gate. The second charge-drainer is associated with the third diode row, and is located between the third diode row and the output gate. One of the first and second charge-drains is activated to drain signal charges not used as an output signal. Thus, in accordance with a resolution required when images are read out, a high or low resolution may be selected.

It is preferable that the output gate is comprised of gate electrodes in three stages, arranged in a direction in which the signal charges are transferred.

If an area at a side of the charge-detecting capacitor about the output gate is narrower than an area at a side of the charge transfer device about the output gate, a channel length is lengthy and a channel width is narrow, resulting in charge stagnation just below the output gate. By constituting the output gate of three-stage electrodes directing towards the charge-detecting capacitor from the charge transfer device, and further by applying a higher voltage to an electrode associated with the charge-detecting capacitor than a voltage applied to an electrode associated with the output gate, it would be possible to increase the number of steps of a stepped potential increasing towards the charge-detecting capacitor, just below the output gate, ensuring smooth transfer of charges.

It is preferable that a middle-stage gate electrode among the three-stage electrodes has a projection projecting towards an initial-stage gate electrode.

For instance, an initial-stage electrode is formed with a slit in facing relation with an area in which two adjacent charge transfer devices meet each other just below the output gate, and a middle-stage electrode is formed with a projection in alignment with the slit. A potential just below the projection is higher than a potential just below the initial-stage electrode, and hence, it would be possible to prevent charges transferred through a charge transfer device and charges transferred through another charge transfer device, from mixing with each other. Thus, device isolation can be accomplished between two adjacent charge transfer devices.

There is further provided a CCD image sensor including (a) a plurality of charge transfer devices each transferring signal charges in a column direction, (b) a charge-detecting capacitor receiving signal charges at different timings from one another from the charge transfer devices through an output gate to which the charge transfer devices are connected, and (c) a charge-detector detecting signal charges stored in the charge-detecting capacitor, the output gate being comprised of gate electrodes in a plurality of stages, arranged in a direction in which the signal charges are transferred, a second—or later—stage gate electrode having a projection projecting towards the previous-stage gate electrode.

In the above-mentioned CCD image sensor, charges transferred through a plurality of charge transfer devices enter the output gate at different timings from one another, and are input into the charge-detecting capacitor. The output is comprised of at least two gate electrodes. One of the gate electrodes located second or more from the charge-detecting device is designed to have a projection projecting towards the previous-stage gate electrode. For instance, an initial-stage electrode is formed with a slit in facing relation with an area in which two adjacent charge transfer devices meet each other just below the output gate, and a middle-stage electrode is formed with a projection in alignment with the slit. A potential just below the projection is higher than a potential just below the initial-stage electrode, and hence, it would be possible to prevent charges transferred through a charge transfer device and charges transferred through another charge transfer device, from mixing with each other. Thus, device isolation can be accomplished between two adjacent charge transfer devices.

It is preferable that the output gate is comprised of gate electrode in three stages.

By applying a higher voltage to an electrode associated with the charge-detecting capacitor than a voltage applied to an electrode associated with the charge transfer device, it would be possible to increase the number of steps of a stepped potential just below the output gate, ensuring smooth transfer of charges from the charge transfer device towards the charge-detecting capacitor.

It is preferable that a second-stage gate electrode has a projection located between two charge transfer devices located adjacent to each other, when viewed from above, and a third-stage gate electrode has a projection located at the center of the charge-detecting capacitor, when viewed from above.

A first-stage electrode is formed with a slit in facing relation with an area in which two adjacent charge transfer devices meet each other just below the output gate, and a second-stage electrode is formed with a projection in alignment with the slit. A potential just below the projection is higher than a potential just below the initial-stage electrode, and hence, it would be possible to accomplish device isolation between two adjacent charge transfer devices. Further, in order to smooth charge transfer towards the charge-detecting capacitor, the second-stage electrode is formed with a slit in facing relation with a center of the charge-detecting capacitor, and the third-stage electrode is formed with a projection in alignment with the slit. Thus, it would be possible to smooth charge transfer towards the charge-detecting capacitor.

The advantages obtained by the aforementioned present invention will be described hereinbelow.

In the above-mentioned CCD image sensor in accordance with the present invention, charges transferred through three, four or more charge transfer devices enter the output gate at different timings from one another, and are input into the charge-detecting capacitor. Thus, it is possible to fabricate a photodiode in a small size without fabrication of a charge transfer device in a small size and further without necessity of a switch.

By forming an electrode located subsequently to an initial-stage electrode of the output gate with a projection between two charge transfer devices located adjacent to each other, a potential just below the projection is higher than a potential just below the initial-stage electrode, and hence, it would be possible to prevent charges transferred through a charge transfer device and charges transferred through another charge transfer device, from mixing with each other. Thus, device isolation can be accomplished between two adjacent charge transfer devices.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 16 is a plan view of a lower layer underlying what is illustrated in FIG. 15 in the area.

FIG. 19 is a plan view of a CCD image sensor in accordance with the fifth embodiment of the present invention.

DESCRIPTION OF THE PREFERRED EMBODIMENTS

Preferred embodiments in accordance with the present invention will be explained hereinbelow with reference to drawings.

[First Embodiment]

Figure 7:
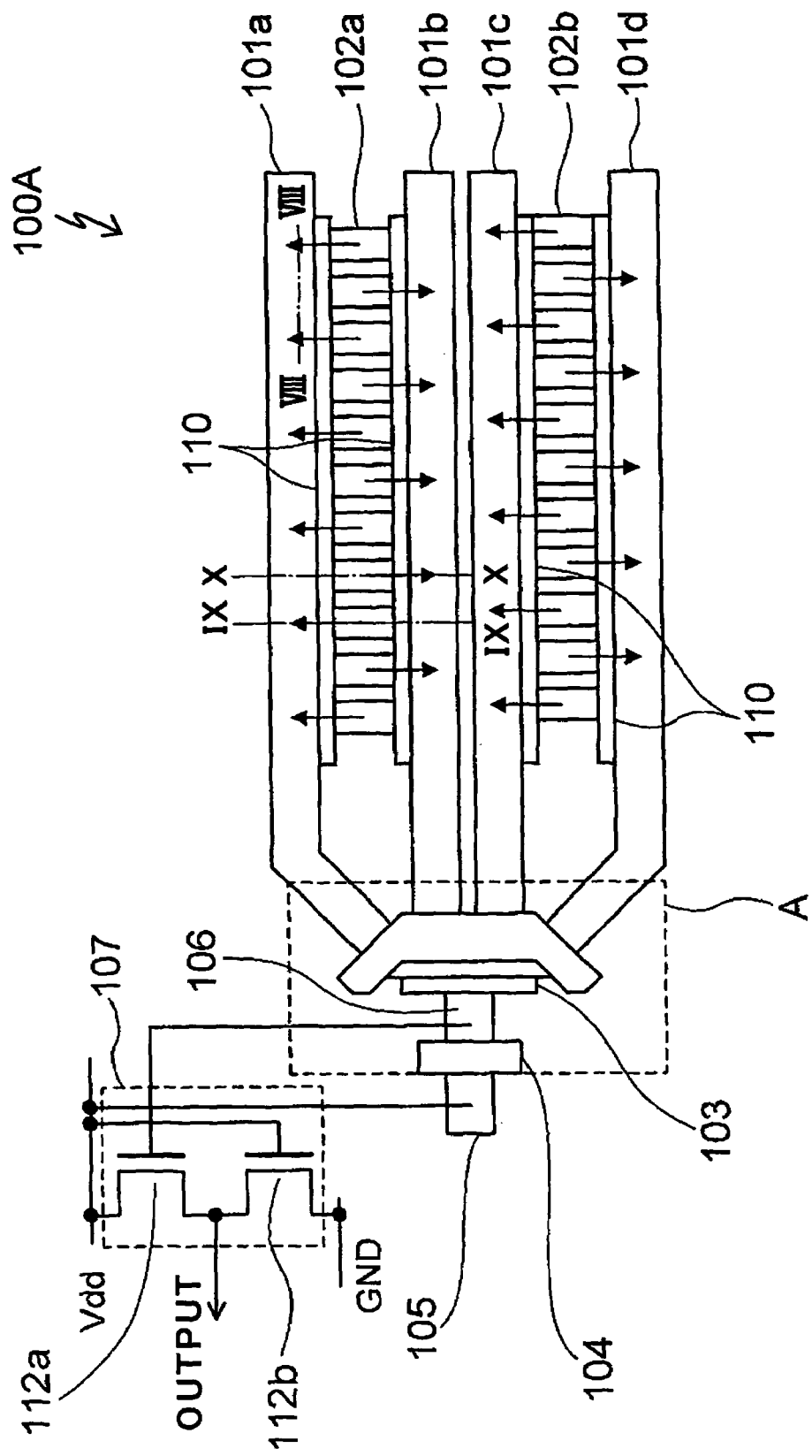
FIG. 7 is a plan view of a CCD image sensor in accordance with the first embodiment of the present invention.

FIG. 7 is a plan view of a CCD image sensor in accordance with the first embodiment.

The illustrated CCD image sensor 100A is comprised of first to fourth rows of charge transfer devices 101a, 101b, 101c and 101d, first and second rows of photodiodes 102a and 102b, an output gate 103 to which the first to fourth rows of charge transfer devices 101a, 101b, 101c and 101d are commonly connected, a reset gate 104, a drain 105, a charge-detecting capacitor 106 comprised of a floating source, and a source follower circuit 107 acting as a charge-detector.

The first to fourth charge transfer devices 101a, 101b, 101c and 101d are identical with one another in structure, and the first and second photodiodes 102a and 102b are identical with each other in structure. A charge-reading gate 110 is arranged between each of the first to fourth charge transfer devices 101a, 101b, 101c and 101d and each of the first and second photodiodes 102a and 102b. Each of the first and second photodiodes 102a and 102b includes photodiodes emitting charges or photodiode signals, based on received light, and equally spaced from one another.

When a two-phase driving signal is applied to a charge-transfer electrode (not illustrated), each of the first to fourth charge transfer devices 101a, 101b, 101c and 101d transfers charges ejected from the first and second photodiodes 102a and 102b, towards the output gate 130. The output gate 130 outputs charges having been transferred through the first to fourth charge transfer devices 101a, 101b, 101c and 101d, to the charge-detecting capacitor 106.

The charge-detecting capacitor 106 generates a voltage in accordance with the received charges, and supplies the voltage to the source follower circuit 107. The source follower circuit 107 is comprised of two MOS transistors 112a and 112b. The source follower circuit 107 converts charges input into the charge-detecting capacitor 106, into a voltage signal for producing a photodiode output signal, and outputs the signal to an amplifier (not illustrated).

The reset gate, on receipt of a reset signal, has the drain 105 electrically connected to a power source Vdd, and the charge-detecting capacitor 106 had a common voltage to thereby reset charges having been input into the charge-detecting capacitor 106.

Figure 8:
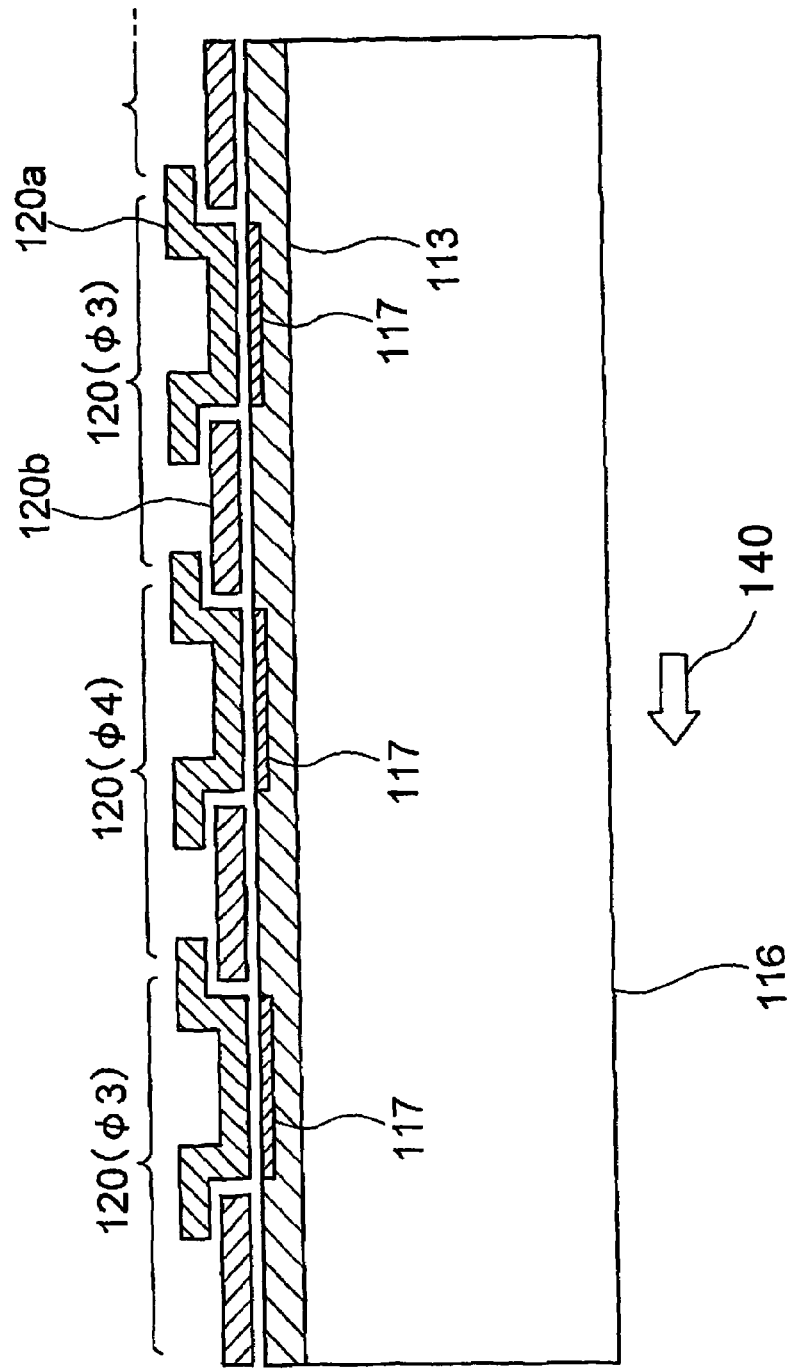
FIG. 8 is a cross-sectional view taken along the line VIII—VIII in FIG. 7.

FIG. 8 is a cross-sectional view taken along the line VIII—VIII in FIG. 7.

The first charge transfer device 101a is formed on a p-type substrate 116, and includes a n-type well 113 and $n^-$-type wells 117 having a carrier concentration lower than the same of the n-type well 113.

Charge-transfer electrodes 120 for transferring charges are formed on the n-type well 113 and the $n^-$-type wells 117. Each of the charge-transfer electrodes 120 is comprised of a pair of an electrode 120a and an electrode 120b both of which are electrically connected to common signal wires.

The first charge transfer device 101a transfers charges in a direction indicated with an arrow 140. The p-type substrate 116 is covered at a surface thereof with an electrically insulating film. A pair of wires (not illustrated) is electrically connected to each of the charge-transfer electrodes 120 for inputting a charge-transfer signal therethrough.

A plurality of the charge-transfer electrodes 120 are arranged in the direction 140 in the first charge transfer device 101a. K-th charge-transfer electrodes 120 as counted from the output gate wherein K is an odd number are electrically connected to a first signal wire, and L-th transfer electrode 120 as counted from the output gate wherein L is an even number are electrically connected to a second signal wire. For instance, a charge-transfer signal $\phi$ 3 is applied to the K-th charge-transfer electrodes 120 through the first signal wire, and a charge-transfer signal $\phi$ 4 is applied to the L-th charge-transfer electrodes 120 through the second signal wire.

The $n^-$-type wells 117 is formed just below each of the charge-transfer electrodes 120a, and hence, a potential just below the charge-transfer electrodes 120a is higher than a potential just below the charge-transfer electrode 120b to which the same voltage as a voltage applied to the charge-transfer electrode 120a is applied, in accordance with a difference in a carrier concentration. Accordingly, just below the charge-transfer electrode 120, a potential decreases in the direction 140, ensuring that charges are smoothly transferred in the direction 140.

Referring back to FIG. 7, photodiodes in the first diode row 102a and photodiodes in the second photodiode row 102b are staggered to each other by a half pitch. In each of the first and second photodiode rows 102a and 102b, photodiodes ejecting charges to the first and third charge transfer devices 101a and 101c through the charge-reading gates 110 and photodiodes ejecting charges to the second and fourth charge transfer devices 101b and 101d through the charge-reading gates 110 are alternately arranged. In FIG. 7, the first and second photodiode rows 102a and 102b eject charges in directions indicated with arrows. Charges ejected to the first and second charge transfer devices 101a and 102a from the first photodiode row 102a and charges ejected to the third and fourth charge transfer devices 101c and 102d from the second photodiode row 102b are successively transferred to the output gate 103 in accordance with charge-transfer signals applied to the charge-transfer electrodes 120 of the first to fourth charge transfer devices 101a to 101d.

Figure 9:
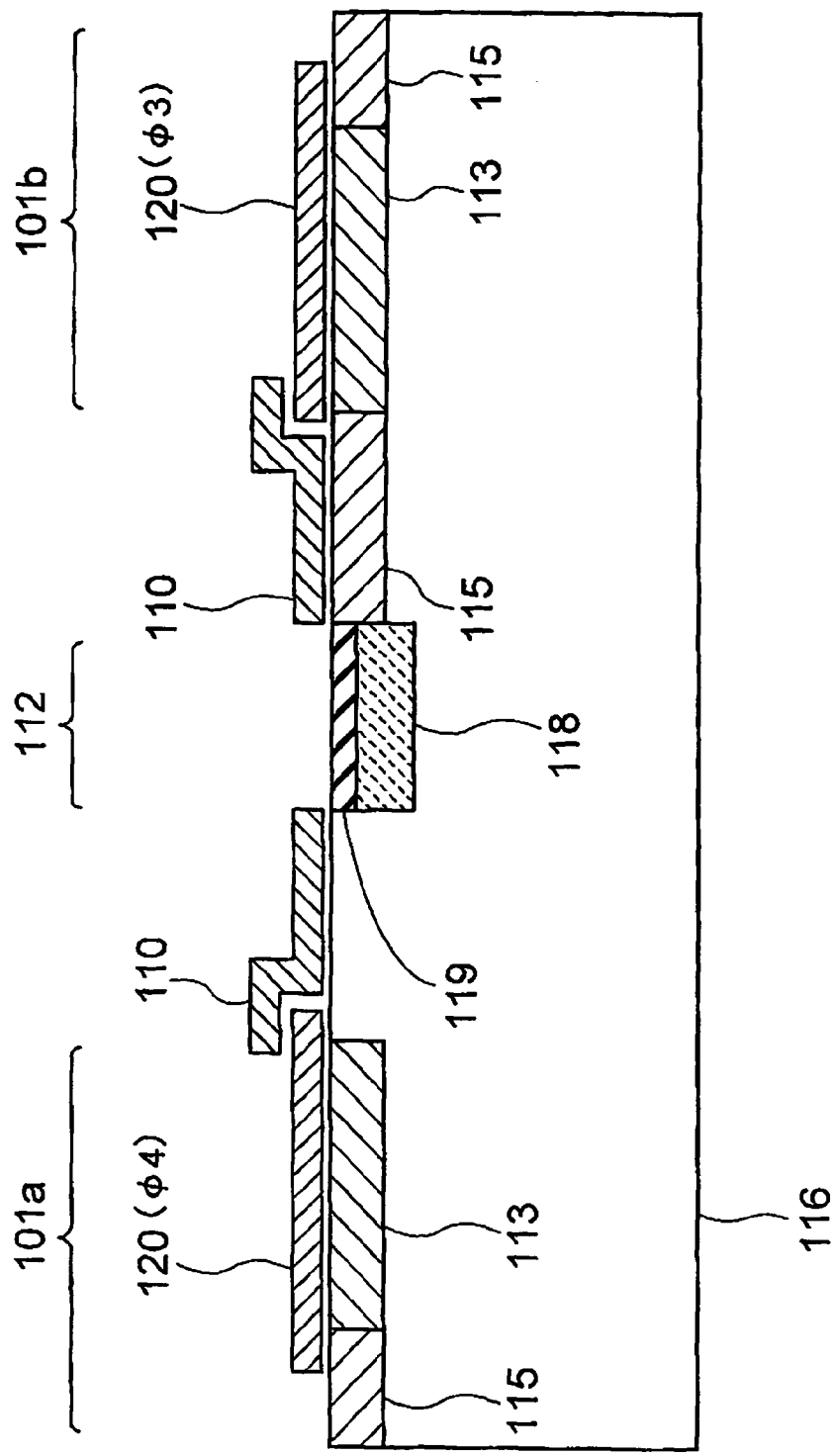
FIG. 9 is a cross-sectional view taken along the line IX—IX in FIG. 7.
Figure 10:
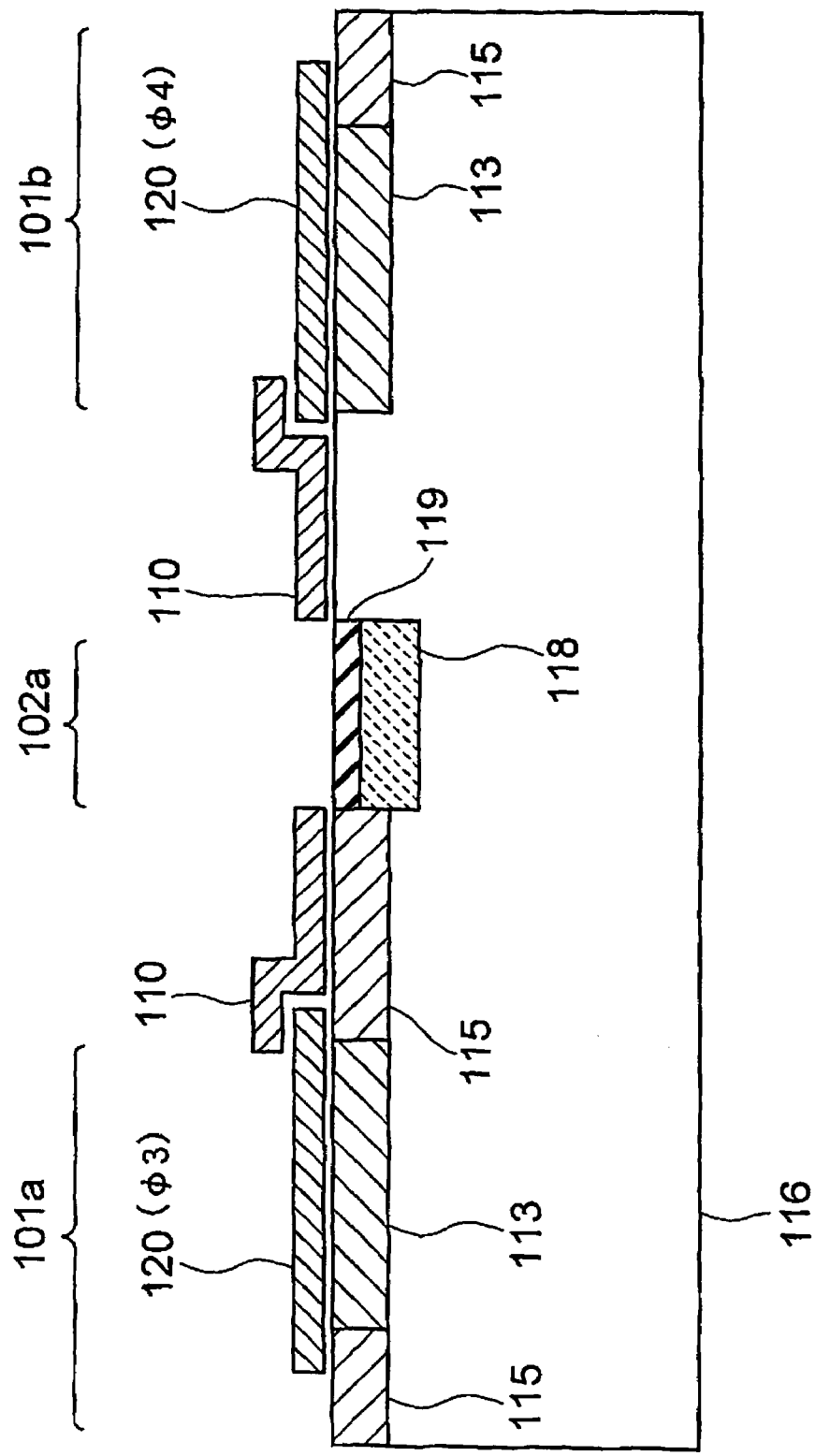
FIG. 10 is a cross-sectional view taken along the line X—X in FIG. 7.

FIG. 9 is a cross-sectional view taken along the line IX—IX in FIG. 7, and FIG. 10 is a cross-sectional view taken along the line X—X in FIG. 7.

The first and second charge transfer devices 101a and 101b and the first photodiode row 102a as well as other charge transfer devices and photodiode row are formed on the p-type substrate 116. The first photodiode row 102a is comprised of a photodiode n-type well 118 and a p-type diffusion layer 119 formed on the photodiode n-type well 118, and produces charges in an amount in proportion with energy of received light.

As illustrated in FIGS. 9 and 10, $p^+$ channel stoppers 115 each comprised of a $p^+$ diffusion layer are formed between the first photodiode row 102a and one of the first and second charge transfer devices 101a and 110b, and further outside the first and second charge transfer devices 101a and 101b at the opposite side of the first photodiode row 102a in order to prevent movement of charges.

The charge-reading gate 110, when a charge-reading gate signal is applied thereto, raises a potential at a surface of the p-type substrate 116 located just therebelow, and outputs charges produced in the first photodiode row 101a, to the first or second charge transfer device 101a or 101b. Charges produced in the first photodiode 102a are output to the first charge transfer device 101a through the charge-reading gate 110 below which the $p^+$ channel stopper 115 is not formed, in FIG. 9, and output to the second charge transfer device 101b through the charge-reading gate 110 below which the $p^+$ channel stopper 115 is not formed, in FIG. 10.

Charge-transfer signals $\phi$ 3 and $\phi$ 4 are applied to the charge-transfer electrodes 120 in the first and second charge transfer devices 101a and 101b facing each other with the first photodiode row 102a located therebetween. The charge-transfer signals $\phi$ 3 and $\phi$ 4 are two-phase driving signals having phases inverted to each other or phases deviated from each other by a half cycle.

Figure 11:
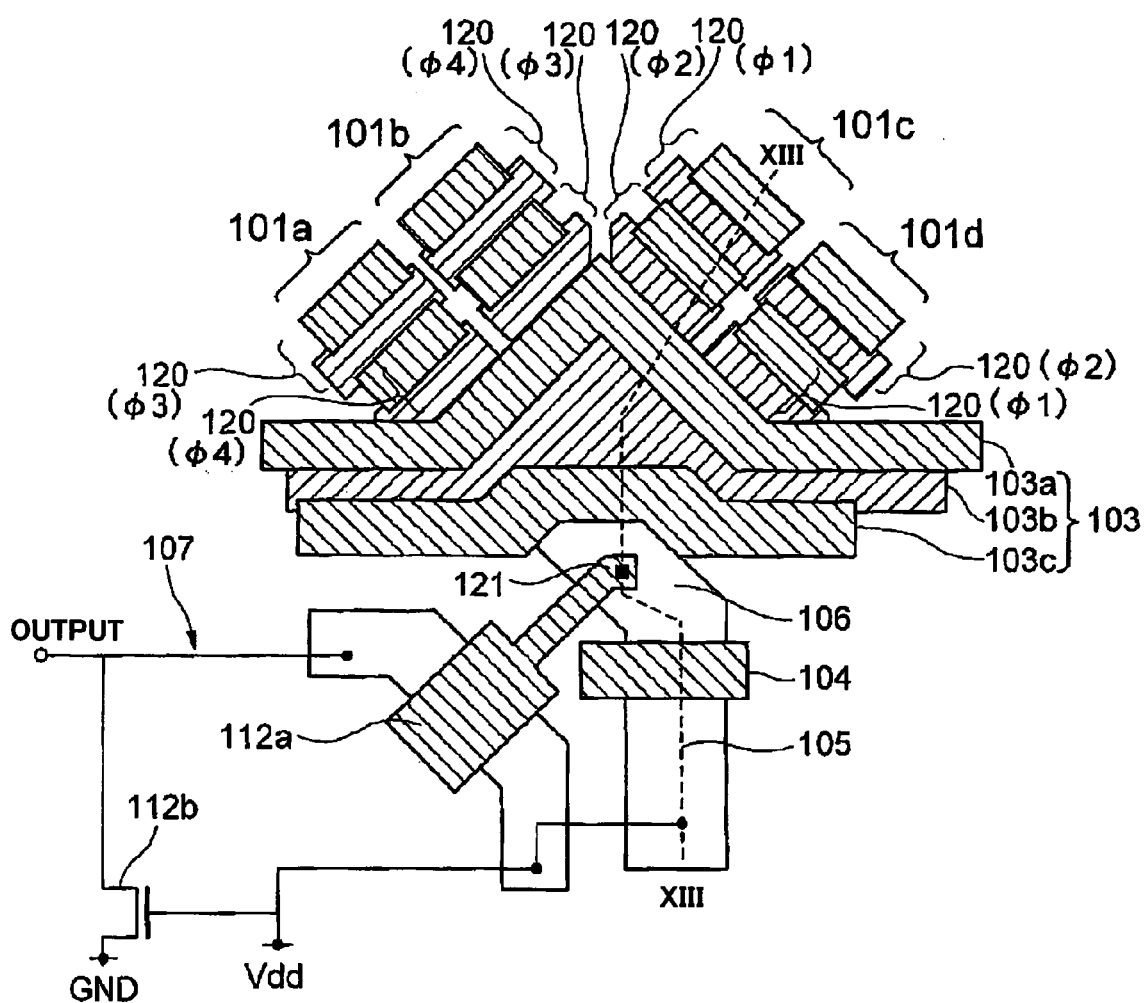
FIG. 11 is an enlarged plan view of the area A in FIG. 7.
Figure 12:
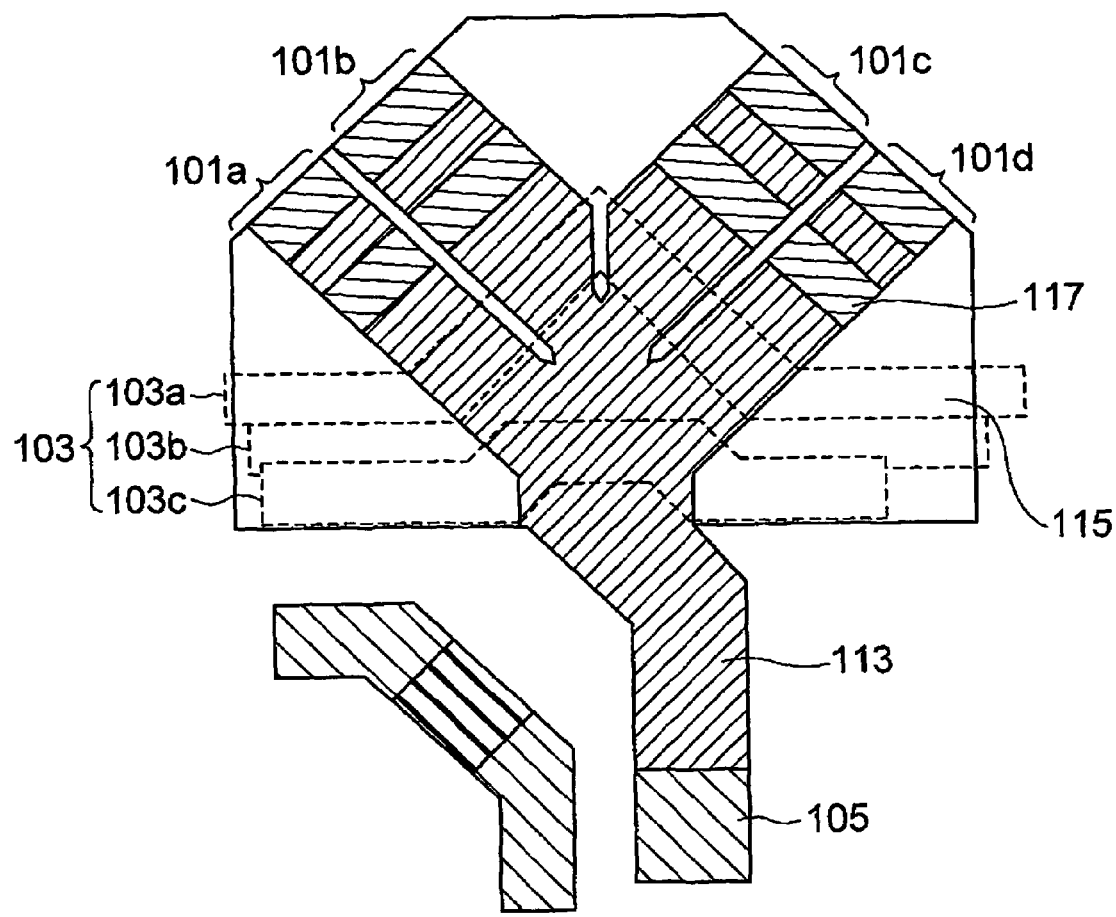
FIG. 12 is a plan view of a lower layer underlying what is illustrated in FIG. 11 in the area A.
Figure 13:
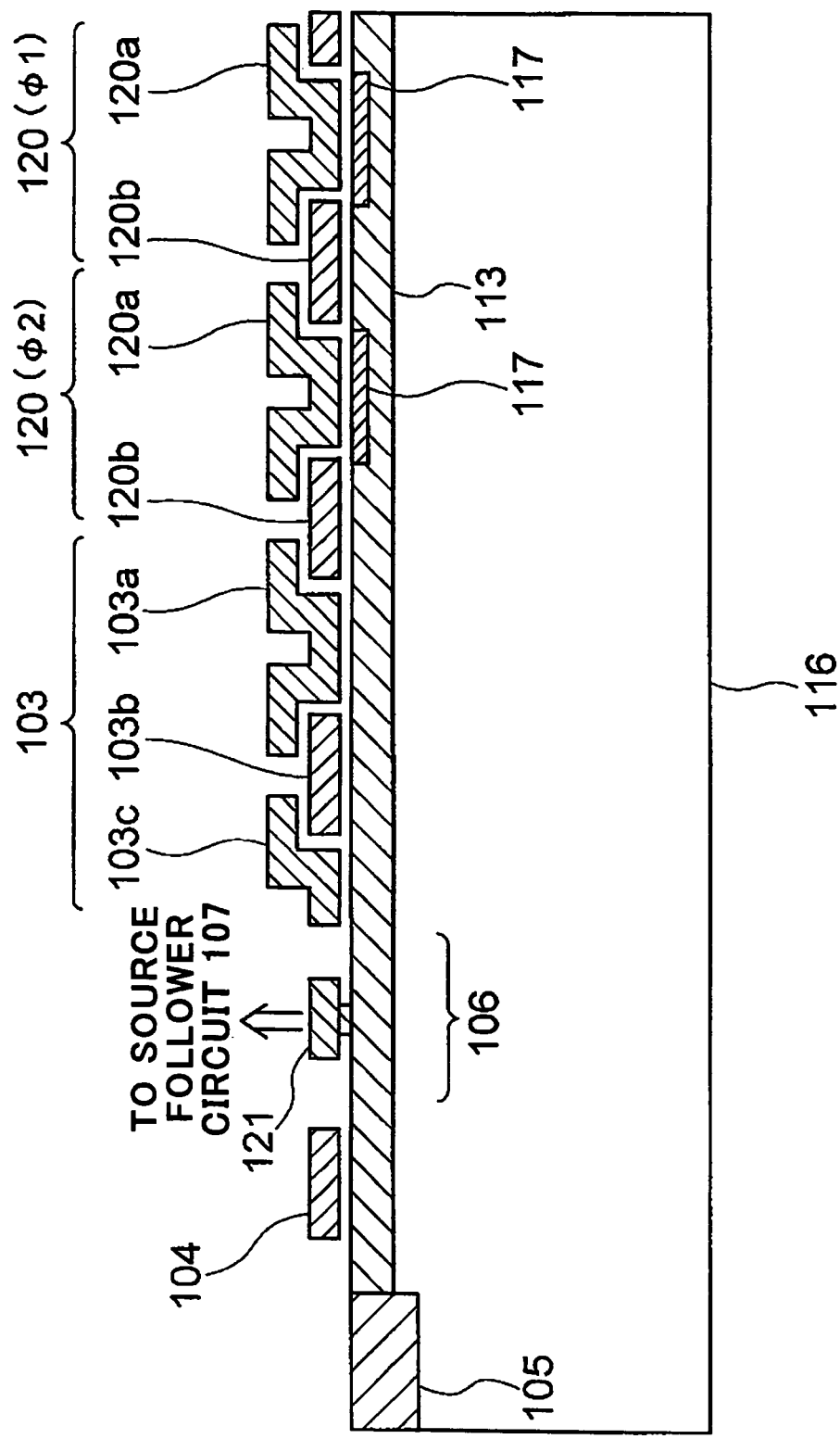
FIG. 13 is a cross-sectional view taken along the line XIII—XIII in FIG. 11.

FIG. 11 is an enlarged plan view of the area A in FIG. 7, FIG. 12 is a plan view of a lower layer underlying what is illustrated in FIG. 11 in the area A, and FIG. 13 is a cross-sectional view taken along the line XIII—XIII in FIG. 11.

As illustrated in FIG. 11, the output gate 103 is comprised of three gate electrodes 103a, 103b and 103c comprised of a first or second layer composed of polysilicon.

In the first and second charge transfer devices 101a and 101b, the charge-transfer signals $\phi$ 3 and $\phi$ 4 are applied to the charge-transfer electrodes 120 to move charges. In the third and fourth charge transfer devices 101c and 101d, the charge-transfer signals $\phi$ 1 and $\phi$ 2 are applied to the charge-transfer electrodes 120 to move charges. The output gate 130 outputs charges having been transferred through the first to fourth charge transfer devices 101a to 101d, into the charge-detecting capacitor 106.

As illustrated in FIG. 12, the $p^+$ channel stoppers 115 are formed between the first to fourth charge transfer devices 101a to 101d in a lower layer in the area A illustrated in FIG. 7. Just below the output gate 130 illustrated with a broken line in FIG. 12, the $p^+$ channel stopper 115 is formed over the first-stage gate electrode 103a and a part of the second-stage gate electrode 103b. By forming the $p^+$ channel stopper 115 over a part of the second-stage gate electrode 103b, it would be possible to prevent charges transferred through a charge transfer device from intruding into other charge transfer devices.

As illustrated in FIG. 13, the output gate 103 includes the three gate electrodes 103a, 103b and 103c, and a n-type well 113 formed at a surface of the p-type substrate 116. Predetermined voltages are applied to the gate electrodes 103a to 103c such that the gate electrodes 103a to 103c have potentials different from one another. For instance, the voltages applied to the gate electrodes 103a to 103c are determined to become higher towards the charge-detecting capacitor 106 from the charge transfer devices 101a to 101d. Thus, charges can be readily transferred to the charge-detecting capacitor 106 through the first to fourth charge transfer devices 101a to 101d.

Figure 14:
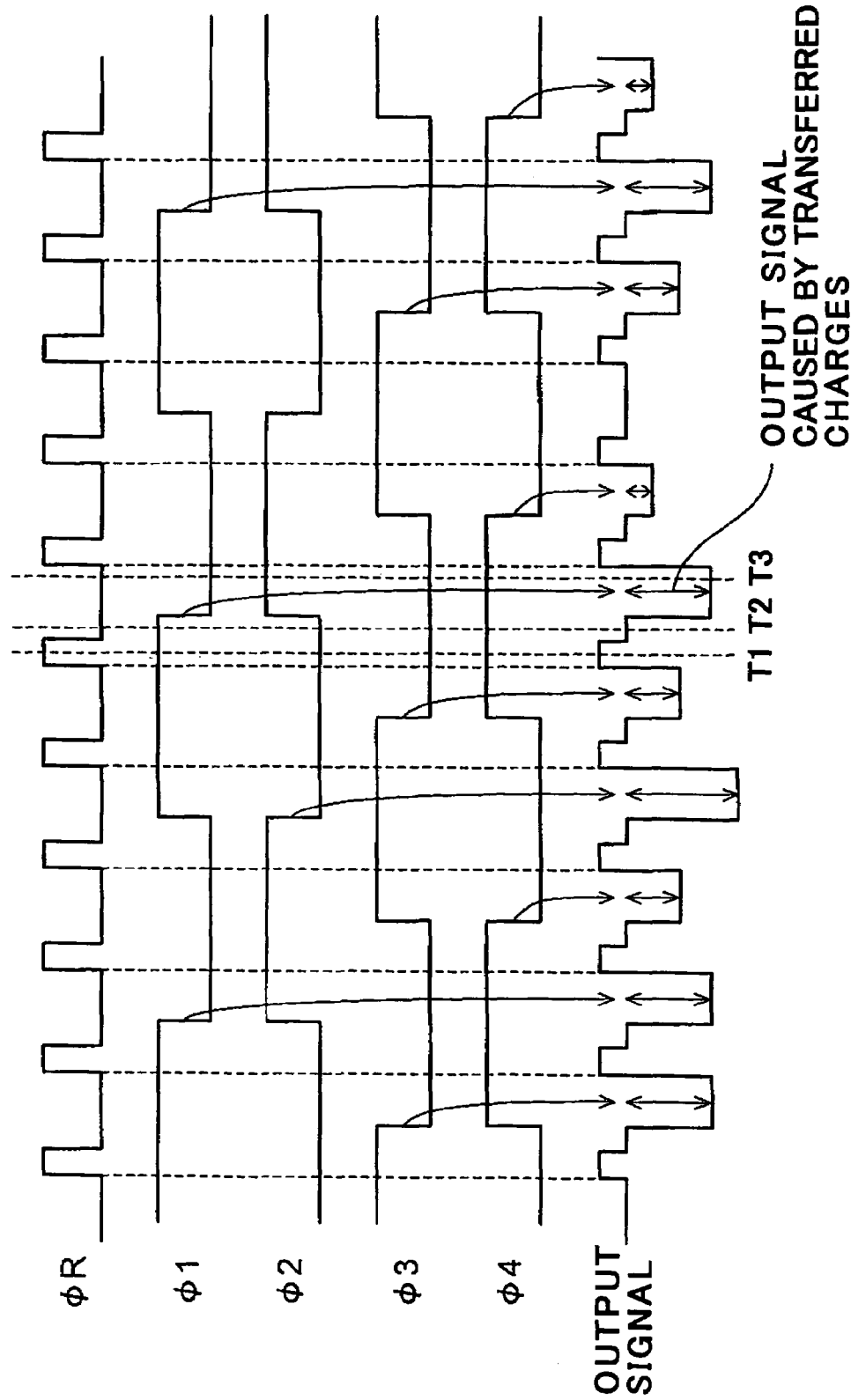
FIG. 14 is a timing chart showing signals to be applied to components of the CCD image sensor in accordance with the first embodiment.

FIG. 14 is a timing-chart showing signals to be applied to the first to fourth charge transfer devices 101a to 101d.

On receipt of the two-phase driving signals $\phi$ 1 and $\phi$ 2 or $\phi$ 3 and $\phi$ 4, the first to fourth charge transfer devices 101a to 101d transfers charges towards the output gate 103. The signals $\phi$ 1, $\phi$ 2, $\phi$ 3 and $\phi$ 4 have such waveforms that charges having been transferred through the first to fourth charge transfer devices 101a to 101d pass through the output gate 103 and enter the charge-detecting capacitor 106 at timings different from one another.

In each of the first to fourth charge transfer devices 101a to 101d, charges are transferred towards the output gate 103 at trailing edges of the signals φ 1, φ 2, φ 3 and φ 4. As illustrated in FIG. 14, the signals φ 1 and φ 2 have a common cycle and phases inverted to each other, and the signals φ 3 and φ 4 have the same cycle as that of the signals φ 1 and φ 2, and phases inverted to each other. The signals φ 1 and φ 3 have phases staggered to each other by a quarter cycle, and similarly, the signals φ 2 and φ 4 have phases staggered to each other by a quarter cycle. Accordingly, each of the first to fourth charge transfer devices 101a to 101d outputs charges towards the charge-detecting capacitor 106 once in a cycle of the signals φ 1 to φ 4.

A reset signal φ R has four pulses in a cycle of the signals φ 1 to φ 4.

For instance, at the time T1, the drain 105 and the charge-detecting capacitor 106 have a common potential because of reset pulses of the reset signal φ R, and charges having been transferred from the charge transfer device 101b and having entered the charge-detecting capacitor 106 immediately before the time T1 are reset. As a result, an output signal has a high potential.

At the time T2, a pulse of the reset signal φ R falls down, and hence, an output signal is kept at an initial potential. When the signal φ 1 falls down at the time T3, charges having been transferred through the charge transfer device 101d enter the charge-detecting capacitor 106. The CCD image sensor 100A outputs an output signal indicative of a voltage determined in accordance with an amount of charges having been input into the charge-detecting capacitor 106.

In the first embodiment, photodiodes in the first and second photodiode rows 102a and 102b are staggered to each other by a half pitch, and charges produced in photodiodes in the first and second photodiode rows 102a and 102b are ejected separately to the first and second charge transfer devices 101a and 101b, and the third and fourth charge transfer devices 101c and 101d. Charges having been transferred through the first to fourth charge transfer devices 101a to 101d pass through the output gate 103 at times different from one another, and then, are output as image output signals through the charge-detecting capacitor 106 and the source follower circuit 107.

Figure 5:
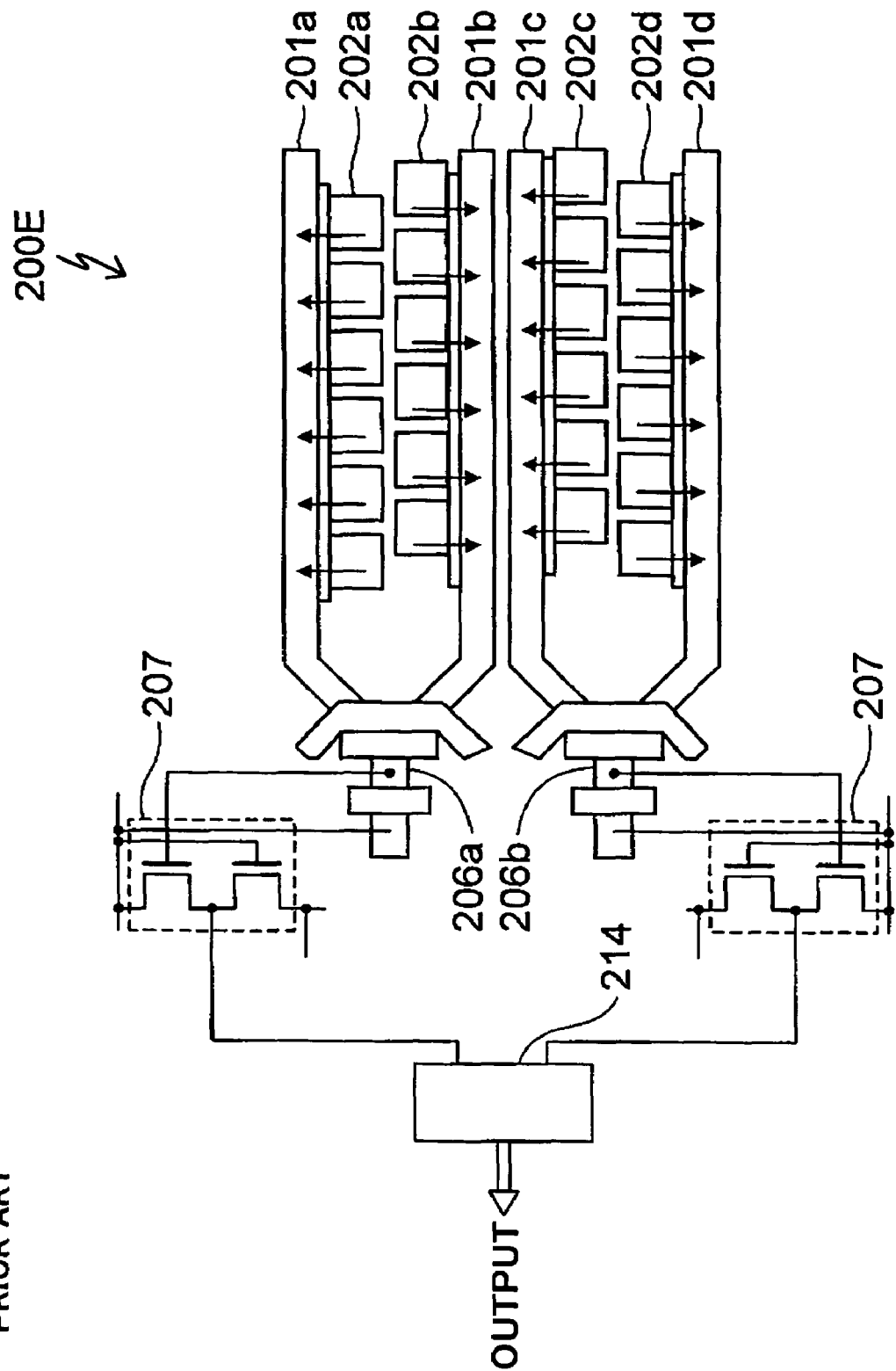
FIG. 5 is a plan view of another conventional CCD image sensor including four photodiodes arranged in staggered arrangement.
Figure 6:
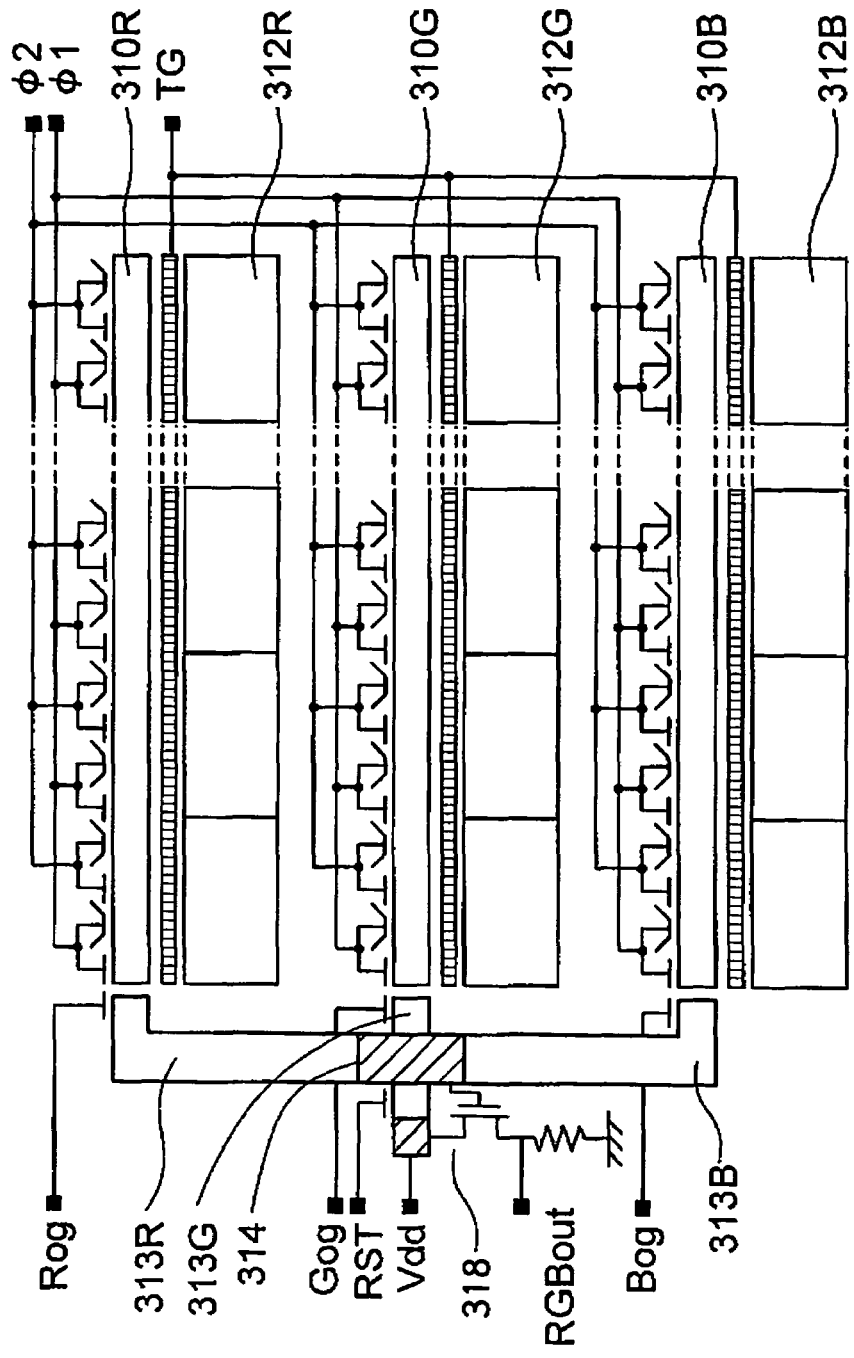
FIG. 6 is a plan view of a conventional color CCD image sensor.

In the CCD image sensor 100A in accordance with the first embodiment, charges having been transferred through the first to fourth charge transfer devices 101a to 101d enter the charge-detecting capacitor 106 to which the first to fourth charge transfer devices 101a to 101d are connected, and photodiodes in the first and second photodiode rows 102a and 102b are staggered to each other by a half pitch. Thus, the CCD image sensor 100A can have a resolution two times greater than a resolution of a dual CCD type CCD image sensor (see FIG. 2), and further, four times greater than a resolution of a single CCD type CCD image sensor (see FIG. 1) without using a switch for switching signals, unlike the conventional CCD image sensor 200E (see FIG. 5) including four photodiodes arranged in staggered arrangement. In other words, the CCD image sensor 100A can have an enhanced resolution without fabricating the first to fourth charge transfer devices 101a to 101d in a small size.

In the conventional CCD image sensor 200E, charges transferred through the two rows of charge transfer devices and charges transferred through another two rows of charge transfer devices are input separately into the charge-detecting capacitor, and image output signals are switched by the switch 214 when being output. When a plurality of charge-detecting capacitors are used, even if each of the charge-detecting capacitors receives a same amount of charges therein, voltages of image output signals may be different from one another due to variance in sensitivity of the charge-detecting capacitors, and further, variance in reset noises. Such variance exerts harmful influence on reproducibility of images.

In contrast, it is possible in the first embodiment to output charges ejected from photodiodes in the first and second photodiode rows 102a and 102b, through the charge-detecting capacity 106, ensuring reproducibility of images.

In addition, in the conventional CCD image sensor 200E, charges input into a charge-detecting capacitor are converted into voltage signals by a source follower circuit, and a selected image output signal is output through a switch to which a switching signal is transmitted.

In the CCD image sensor 100A in accordance with the first embodiment, charges having entered the charge-detecting capacity 106 are immediately converted into voltage signals by the source follower circuit 107, and then, output as image output signals. Hence, the CCD image sensor 100A can operate at a higher speed than the conventional CCD image sensor 200E.

In the first embodiment, the output gate 103 is comprised of the three gate electrodes 103a to 103c. A lower voltage is applied to the gate electrodes 103a to 103c in an area closer to the charge transfer devices 101a to 101d, and a higher voltage is applied to the gate electrodes 103a to 103c in an area closer to the charge-detecting capacity 106. In a conventional CCD image sensor, an output gate is comprised of two gate electrodes. When charges ejected from three or more rows of charge transfer devices are input into a single common charge-detecting capacitor, an area closer to the charge-detecting capacitor is narrower than an area closer to the charge transfer devices just below the output gate, and hence, a channel length is lengthy and a channel width is narrow with the result of stagnation of charge transfer. In contrast, in the first embodiment, the output gate is comprised of three gate electrodes to increase the number of steps of a potential just below the output gate, ensuring smooth transfer of charges.

[Second Embodiment]

Figure 15:
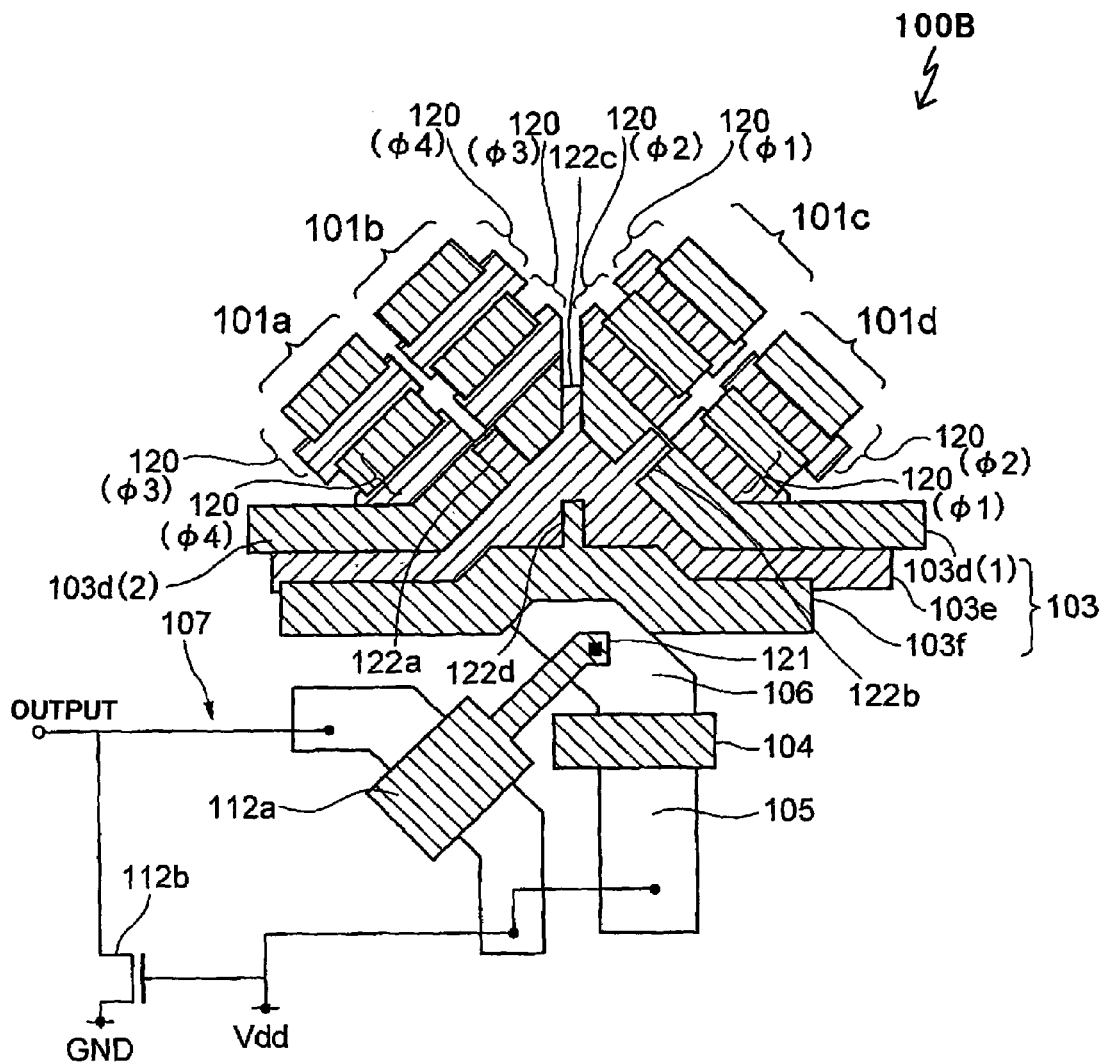
FIG. 15 is an enlarged plan view of an area corresponding to the area A illustrated in FIG. 7, in a CCD image sensor in accordance with the second embodiment of the present invention.

FIG. 15 is an enlarged plan view of an area corresponding to the area A illustrated in FIG. 7, in a CCD image sensor in accordance with the second embodiment of the present invention, and FIG. 16 is a plan view of a lower layer underlying what is illustrated in FIG. 15 in the area.

The CCD image sensor 100B in accordance with the second embodiment is structurally different from the CCD image sensor 100A in a shape of the output gate 103 and a shape of the n-type well 113 underlying the output gate 103.

In the first embodiment, the p+channel stopper 115 extends to an area located just below the gate electrode 130b in a layer underlying the output gate 130, as illustrated in FIG. 12, and a width of the n-type well 113 of the charge transfer devices 101b and 101c becomes narrow in an area directing to the charge-detecting capacitor 106. Hence, the p⁺ diffusion layers are close to each other in the area, resulting in that a potential is reduced due to narrow-channel effect, and hence, a rate at which charges are transferred is reduced. The second embodiment solves such a problem, and accomplishes a higher operation rate of a CCD image sensor.

The output gate 103 in the second embodiment is comprised of three gate electrodes 103d, 103e and 103f. A voltage to be applied to the gate electrodes 103d to 103f increases towards the charge-detecting capacitor 106 from the charge transfer devices 101a to 101d, similarly to the first embodiment.

The gate electrode 103d which is a first stage as viewed from the charge transfer devices 101a to 101d is comprised of two gate electrodes 103(1) and 103(2). The gate electrode 103d is formed with slits in alignment with an area sandwiched between two adjacent charge transfer devices among the charge transfer devices 101a to 101d.

The second-stage gate electrode 103e is formed with first to third projections 122a, 122b and 122c projecting into the slits formed in the first-stage gate electrode 103d in an area sandwiched between two adjacent charge transfer devices among the charge transfer devices 101a to 101d. The second-stage gate electrode 103e is formed further with a slit in the vicinity of a center of the charge-detecting capacitor 106.

The third-stage gate electrode 103f is formed with a fourth projection 122d projecting into the slit of the second-stage gate electrode 103e in the vicinity of a center of each of the charge transfer devices 101a to 101d.

As illustrated in FIG. 16, the $p^+$ channel stopper 115 is formed extending to an area located just below the first-stage gate electrode 103d. The first to third projections 122a to 122c of the second-stage gate electrodes 103e increases a potential of the n-type well 113 located between two adjacent charge transfer devices to thereby prevent charges transferred through any one of the charge transfer devices from mixing with charges transferred through the other charge transfer device. The fourth projection 122d of the third-stage gate electrode 103f increases a potential in the vicinity of a center of the output gate 103 to thereby prevent reduction of a charge-transfer rate caused by an increase in a channel length, ensuring that charges are smoothly transferred to the charge-detecting capacitor 106.

In the second embodiment, the first to third projections 122a to 122c of the second-stage gate electrodes 103e increases a potential just therebelow to thereby prevent charges transferred through any one of the charge transfer devices from mixing with charges transferred through the other charge transfer device. The fourth projection 122d of the third-stage gate electrode 103f increases a potential in the vicinity of a center of the output gate 103 to thereby prevent reduction in a charge-transfer rate caused by an increase in a channel length due to the first to third projections 122a to 122c. Since each of the first to third projections 122a to 122c is formed in the slits formed with the first—and second—stage gate electrodes 103d and 103e, the n-type well 113 does not appear at a surface of the substrate, not preventing transfer of charges.

In the first embodiment, as mentioned earlier, charges are prevented from being mixed with each other by forming the $p^+$ channel stopper 115 between two adjacent charge transfer devices just below the output gate. However, the first embodiment may be accompanied with a problem that the $p^+$ channel stoppers 115 are located quite close to each other to thereby cause narrow-channel effect, and hence, a rate at which charges are transferred may be reduced.

In contrast, in the second embodiment, a potential between two adjacent charge transfer devices is increased just below the output gate 103 to thereby have charges readily transferred towards the charge-detecting capacitor 106 for preventing mixture of charges. As illustrated in FIG. 16, the n-type well 113 of the charge transfer devices 101b and 101c could have a long width in the vicinity of the output gate 103, preventing reduction in a charge-transfer rate caused by narrow-channel effect. Thus, the CCD image sensor in accordance with the second embodiment can operate at a higher rate than the CCD image sensor in accordance with the first embodiment.

[Third Embodiment]

Figure 17:
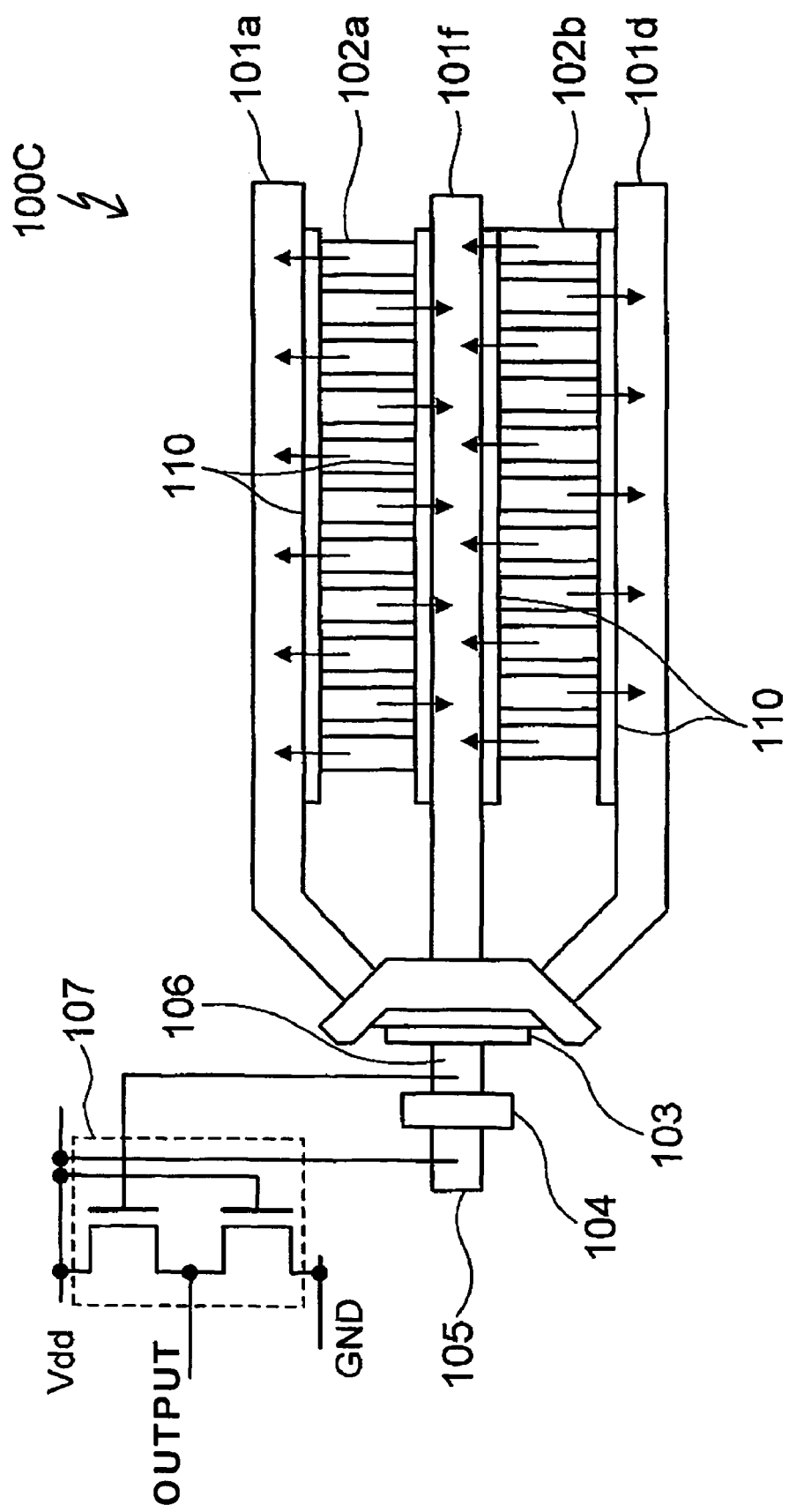
FIG. 17 is a plan view of a CCD image sensor in accordance with the third embodiment of the present invention.

FIG. 17 is a plan view of a CCD image sensor in accordance with the third embodiment of the present invention.

The CCD image sensor 100C in accordance with the third embodiment is structurally different from the CCD image sensors 100A and 100B in accordance with the first and second embodiments in that the CCD image sensor 100C includes a single row of charge transfer device 101f in place of the two rows of charge transfer device 101b and 101c, and charges transferred through any one of the three rows of the charge transfer devices 101a, 101d and 101f are input into the charge-detecting capacitor 106.

Photodiodes in the first and second photodiode rows 102a and 102b eject charges in directions indicated with arrows, for instance. Four rows of charge transfer devices in the CCD image sensors 100A and 100B may be replaced with three rows of charge transfer devices as in the third embodiment.

[Fourth Embodiment]

Figure 18:
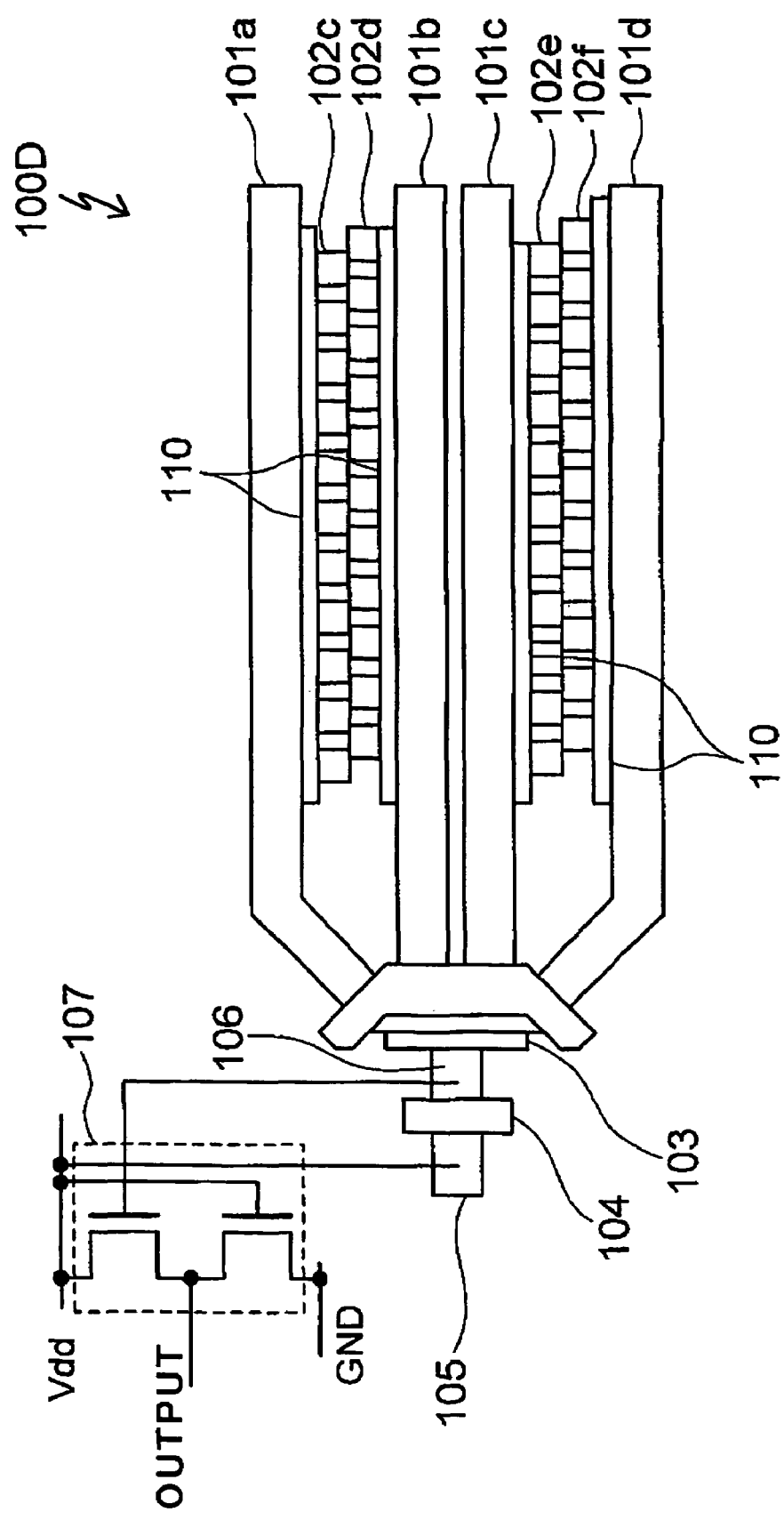
FIG. 18 is a plan view of a CCD image sensor in accordance with the fourth embodiment of the present invention.

FIG. 18 is a plan view of a CCD image sensor in accordance with the fourth embodiment of the present invention.

The CCD image sensor 100D in accordance with the fourth embodiment is structurally different from the CCD image sensors 100A and 100B in accordance with the first and second embodiments in that photodiodes in the first and second photodiode rows 102c and 102d are arranged in staggered arrangement, and similarly, photodiodes in the third and fourth photodiode rows 102e and 102f are arranged in staggered arrangement. Photodiodes in the first photodiode row 102c and photodiodes in the second photodiode row 102d are staggered to each other by a half pitch, and similarly, photodiodes in the third photodiode row 102e and photodiodes in the fourth photodiode row 102f are staggered to each other by a half pitch.

Figure 2:
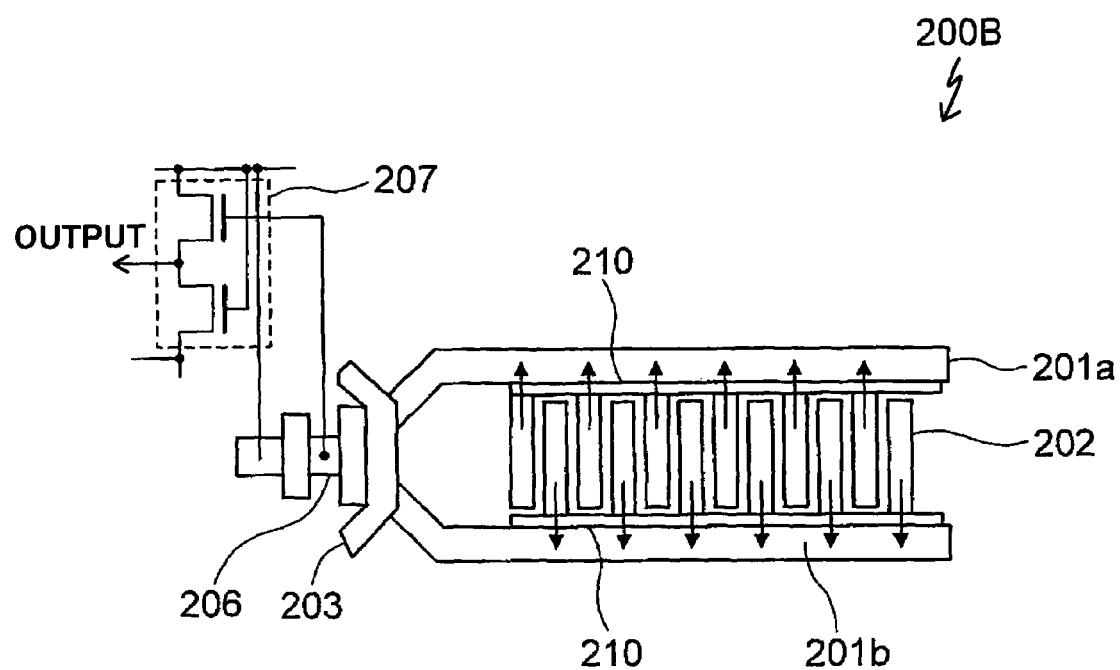
FIG. 2 is a plan view of a conventional dual CCD type CCD image sensor.
Figure 3:
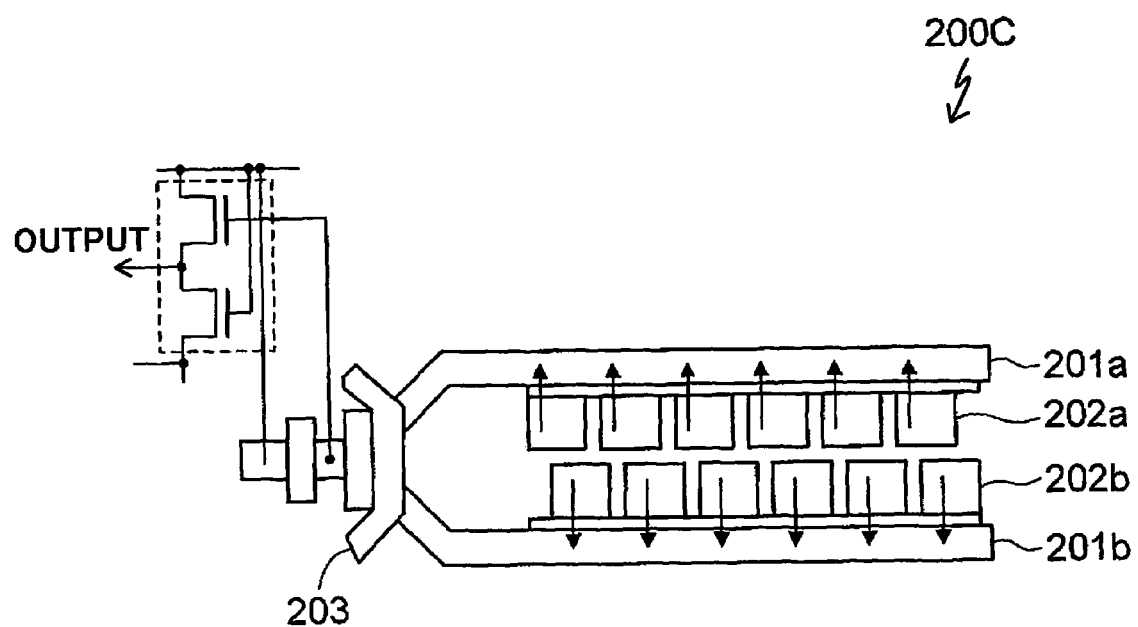
FIG. 3 is a plan view of a conventional CCD image sensor including two photodiodes arranged in staggered arrangement.
Figure 4:
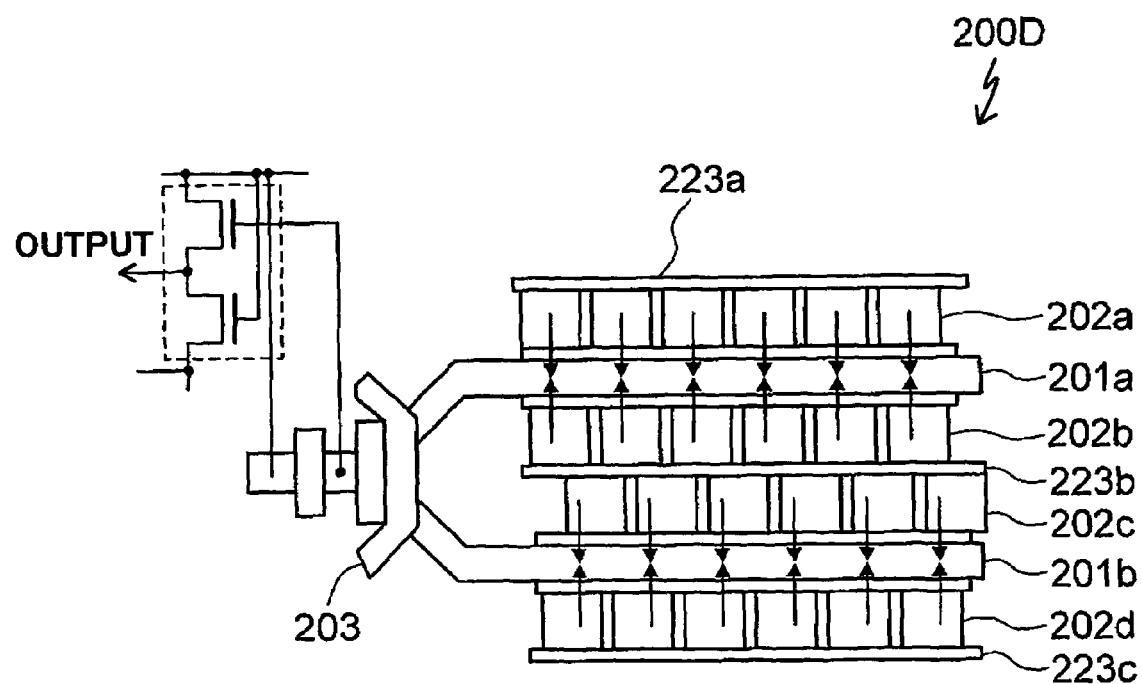
FIG. 4 is a plan view of a conventional CCD image sensor including four photodiodes arranged in staggered arrangement.

The first and second photodiode rows 102c and 102d are obtained if photodiodes in the photodiode row 102a illustrated in FIG. 7 are arranged in staggered arrangement of two photodiodes, illustrated in FIG. 3 in place of a dual CCD type arrangement illustrated in FIG. 2. The third and fourth photodiode rows 102e and 102f are obtained if photodiodes in the photodiode row 102b illustrated in FIG. 7 are arranged in staggered arrangement of two photodiodes in place of a dual CCD type arrangement. Photodiodes in the first photodiode row 102c and photodiodes in the third photodiode row 102e are staggered to each other by a quarter (¼) pitch. That is, photodiodes in the first to fourth photodiode rows 102c, 102d, 102e and 102f are staggered to one another by a quarter pitch in the CCD image sensor 200D.

The CCD image sensor 100D in which photodiodes in the first to fourth photodiode rows 102c to 102f are staggered to one another can present a resolution four times greater than a resolution of a single CCD type CCD image sensor including charge transfer devices having a common length corresponding to a pitch between photodiodes, without necessity of a switch unlike the conventional CCD image sensor 200E including four photodiode rows in which photodiodes are staggered to one another. Thus, the CCD image sensor 100D can have an enhanced resolution without fabricating a charge transfer device in a small size.

[Fifth Embodiment]

FIG. 19 is a plan view of a CCD image sensor in accordance with the fifth embodiment of the present invention.

The CCD image sensor 100E in accordance with the fifth embodiment is structurally different from the above-mentioned first to fourth embodiments in further having first and second charge-drainers 123A and 123B, and in having photodiode rows comprised of photodiodes having different sizes from each other.

The first charge-drainer 123A is sandwiched between the first and second photodiode rows 102c and 102d, and the second charge-drainer 123B is located adjacent to the third photodiode row 102g at the opposite side of the charge-reading gate 110. The first and second charge-drainers 123A and 123B drain charges produced in photodiodes in the first to third photodiode rows 102c, 102d and 102g.

Figure 1:
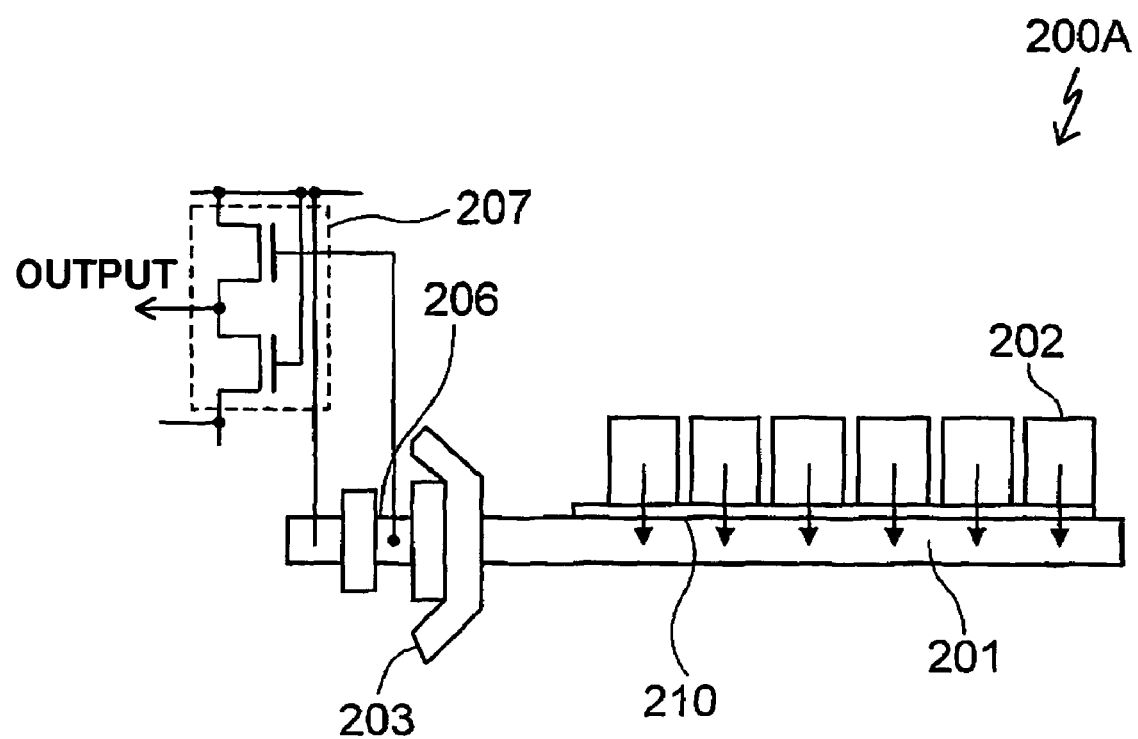
FIG. 1 is a plan view of a conventional single CCD type CCD image sensor.

The third photodiode row 102g is obtained if photodiodes the photodiode rows 102e and 102f illustrated in FIG. 18 are arranged in a single CCD type arrangement illustrated in FIG. 1 in place of the staggered arrangement of two photodiode rows illustrated in FIG. 3.

For instance, photodiodes in the first and second photodiode rows 102c and 102d are half in size relative to photodiodes in the third photodiode row 102g.

The CCD image sensor 100E is designed to have a designated resolution at which images are read out, and selectively outputs image output signals produced based on charges ejected from the first and second photodiode rows 102c and 102d, and charges ejected from the third photodiode row 102g.

If a low resolution is selected in the CCD image sensor 100E, the first charge-drainer 123A, on receipt of a command signal transmitted from a control circuit (not illustrated), drains charges produced in the first and second photodiode rows 102c and 102d. Thus, even if a charge-reading pulse is applied to the charge-reading gate 110, charges ejected from the photodiodes are not output to the first and second charge transfer devices 101a and 110b. Charges ejected from the third photodiode rows 102g including a large-sized photodiodes are input into the charge-detecting capacitor 106 through the charge-reading gate 110 and the third charge transfer device 101d, and then, output as an image signal having a low resolution.

If a high resolution is selected in the CCD image sensor 100E, the second charge-drainer 123B, on receipt of a command signal transmitted from a control circuit (not illustrated), drains charges produced in the third photodiode row 102g. Thus, even if a charge-reading pulse is applied to the charge-reading gate 110, charges ejected from the photodiodes are not output to the third charge transfer device 101d. Charges ejected from the first and second photodiode rows 102c and 102d including two photodiode rows in which photodiodes are arranged in staggered arrangement are input into the charge-detecting capacitor 106 through the charge-reading gate 110 and the first and second charge transfer devices 101a and 101b, and then, output as an image signal having a high resolution.

Charges transferred through three or more rows of charge transfer devices may be input into a single charge-detecting capacitor 106, and photodiodes ejecting charges into the first and second charge transfer devices 101a and 101b and photodiodes ejecting charges into the third charge transfer device 101d may be different in size from each other, like the CCD image sensor 100E in accordance with the fifth embodiment. In accordance with a resolution required for reading images, a high or low resolution may be selected.

In the above-mentioned first to fifth embodiments, the output gate 103 is comprised of three gate electrodes. As an alternative, the output gate 103 may be comprised of four or more gate electrodes.

In the above-mentioned first to fifth embodiments, the charge-transfer electrode 120 and the gate electrodes 103a to 103c are comprised of a two-layered polysilicon electrode. As an alternative, they may be composed of material other than polysilicon.

In the above-mentioned first to fifth embodiments, two-phase driving signals are used as charge-transfer signals. As an alternative, other signals may be used, if the signals cause charges transferred through charge transfer devices to be input into a charge-detecting capacitor at different timings from one another.

The CCD image sensor 100B in accordance with the second embodiment is designed to have a structure in which an initial-stage gate electrode is formed with a slit in an area sandwiched between two adjacent charge transfer devices, and a next-stage gate electrode is formed with a projection fit into the slit, in order to prevent charges transferred through any one of charge transfer devices and charges transferred through the other charge transfer devices from mixing with each other. Such a structure may be applied to a CCD image sensor in which charges transferred through two charge transfer devices are output from a single charge-detecting capacitor, in which case, an initial-stage gate electrode may be formed with a slit and a second-stage gate electrode may be formed with a projection for preventing that $P^+$ diffusion layers are close to each other with the result of reduction in a rate at which charges are transferred.

The CCD image sensor 100E in accordance with the fifth embodiment is designed to include the first and second charge-drainers 123A and 123B for draining charges before they are ejected to charge transfer devices. It is not always necessary for a charge-drainer to be arranged in the vicinity of photodiodes, if the charge-drainer drains charges ejected from a photodiode row not selected, before the charges pass through an output gate. For instance, a charge-drainer may be arranged in a charge transfer device or at an end of a charge transfer device.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-347723 filed on Nov. 29, 2002 including specification, claims, drawings and summary is incorporated herein by reference in its entirety.

What is claimed is:

1. A charged coupled-device (CCD) image sensor comprising:

at least four charge transfer devices each transferring signal charges in a column direction;

a single charge-detecting capacitor receiving signal charges at different timings from one another from said charge transfer devices through an output gate to which said charge transfer devices are connected; and a charge-detector detecting signal charges stored in said charge-detecting capacitor.

2. The CCD image sensor as set forth in claim 1, wherein said output gate is comprised of gate electrodes in three stages, arranged in a direction in which said signal charges are transferred.

3. The CCD image sensor as set forth in claim 2, wherein a middle-stage gate electrode has includes a projection projecting towards an initial-stage gate electrode.

4. The CCD image sensor as set forth in claim 1, further comprising:
a diode row extending between charge transfer devices located adjacent to each other, said diode row including a first group of photodiodes supplying signal charges to one of said charge transfer devices and a second group of photodiodes supplying signal charges to the other of said charge transfer devices, photodiodes belonging to said first group and photodiodes belonging to said second group being alternately arranged.

5. The CCD image sensor as set forth in claim 4, wherein a first diode row extending between a pair of charge transfer devices and a second diode row extending between another pair of charge transfer devices are arranged at pitches different from each other.

6. The CCD image sensor as set forth in claim 1, further comprising:
a first diode row and a second diode row both extending between charge transfer devices located adjacent to each other,
wherein said first diode row supplies signal charges to one of said charge transfer devices and said second diode row supplies signal charges to the other of said charge transfer devices, and
photodiodes in said first diode row and photodiodes in said second diode row are staggered by a half pitch.

7. The CCD image sensor as set forth in claim 6, wherein two diode rows extending between a pair of charge transfer devices and two diode rows extending between another pair of charge transfer devices are arranged at pitches different from each other.

8. A charged coupled-device (CCD) image sensor comprising:
first, second and third charge transfer devices each transferring signal charges in a column direction;
a first diode row extending between said first and second charge transfer devices, said first diode row including a first group of photodiodes supplying signal charges to said first charge transfer device and a second group of photodiodes supplying signal charges to said second charge transfer device wherein photodiodes belonging to said first group and photodiodes belonging to said second group are alternately arranged;
a second diode row extending between said second and third charge transfer devices, said second diode row including a third group of photodiodes supplying signal charges to said second charge transfer device and a fourth group of photodiodes supplying signal charges to said third charge transfer device, wherein photodiodes belonging to said third group and photodiodes belonging to said fourth group are alternately arranged;
a single charge-detecting capacitor receiving signal charges at different timings from one another from said first to third charge transfer devices through an output gate to which said first to third charge transfer devices are connected; and
a charge-detector detecting signal charges stored in said charge-detecting capacitor.

9. The CCD image sensor as set forth in claim 8, wherein said output gate is comprised of gate electrodes in three stages, arranged in a direction in which said signal charges are transferred.

10. The CCD image sensor as set forth in claim 9, wherein a middle-stage gate electrode has includes a projection projecting towards an initial-stage gate electrode.

11. A charged coupled-device (CCD) image sensor comprising:
a first diode row comprised of photodiodes arranged in a row;
a second diode row extending in parallel with said first diode row and comprised of photodiodes arranged in a row, photodiodes in said second diode row being staggered by a half pitch relative to photodiodes in said first diode row;
a first charge transfer device transferring signal charges received from K-th photodiodes in said first diode row wherein K is an odd number;
a second charge transfer device transferring signal charges received from L-th photodiodes in said first diode row wherein L is an even number;
a third charge transfer device transferring signal charges received from K-th photodiodes in said second diode row;
a fourth charge transfer device transferring signal charges received from L-th photodiodes in said second diode row;
a charge-detecting capacitor receiving signal charges at different timings from one another from said first to fourth charge transfer devices; and
a charge-detector detecting signal charges stored in said charge-detecting capacitor.

12. A charged coupled-device (CCD) image sensor comprising:
a first diode row comprised of photodiodes arranged in a row;
a second diode row extending in parallel with said first diode row and comprised of photodiodes arranged in a row, photodiodes in said second diode row being staggered by a half pitch relative to photodiodes in said first diode row;
a third diode row comprised of photodiodes arranged in a row, photodiodes in said third row being staggered by a quarter pitch relative to photodiodes in said first diode row;
a fourth diode row extending in parallel with said third diode row and comprised of photodiodes arranged in a row, photodiodes in said fourth diode row being staggered by a quarter pitch relative to photodiodes in said second diode row;
first to fourth charge transfer devices transferring signal charged received from said first to fourth diode rows, respectively;
a charge-detecting capacitor receiving signal charges at different timings from one another from said first to fourth charge transfer devices; and
a charge-detector detecting signal charges stored in said charge-detecting capacitor.

13. A charged coupled-device (CCD) image sensor comprising:
a first diode row comprised of photodiodes arranged in a row;
a second diode row extending in parallel with said first diode row and comprised of photodiodes arranged in a row, photodiodes in said second diode row being staggered by a half pitch relative to photodiodes in said first diode row;

a third diode row extending in parallel with said first and second diode rows and comprised of photodiodes arranged in a row, photodiodes in said third row being arranged at a pitch twice greater than a pitch at which photodiodes in said first and second rows are arranged;

first to third charge transfer devices transferring signal charged received from said first to third diode rows, respectively;

a charge-detecting capacitor receiving signal charges at different timings from one another from said first to third charge transfer devices; and a charge-detector detecting signal charges stored in said charge-detecting capacitor.

14. The CCD image sensor as set forth in claim 13, further comprising:

a first charge-drainer to which signal charges ejected from said first and second diode rows are drained, and a second charge-drainer to which signal charges ejected from said third diode row are drained, and wherein one of said first and second charge-drains is activated.

15. A charged coupled-device (CCD) image sensor comprising:

a plurality of charge transfer devices each transferring signal charges in a column direction;

a charge-detecting capacitor receiving signal charges at different timings from one another from said charge transfer devices through an output gate to which said charge transfer devices are connected; and a charge-detector detecting signal charges stored in said charge-detecting capacitor, said output gate being comprised of gate electrodes in a plurality of stages, arranged in a direction in which said signal charges are transferred, a second—or later—stage gate electrode having a projection projecting towards the previous-stage gate electrode.

16. The CCD image sensor as set forth in claim 15, wherein said output gate is comprised of gate electrode in three stages.

17. The CCD image sensor as set forth in claim 16, wherein a second-stage gate electrode has includes a projection located between two charge transfer devices located adjacent to each other, when viewed from above, and a third-stage gate electrode has a projection located at the center of said charge-detecting capacitor, when viewed from above.

18. The CCD image sensor according to claim 1, wherein said at least four charge transfer devices comprise:

at least two dual CCD-type CCD image photodiodes.

19. The CCD image sensor according to claim 1, wherein said at least four charge transfer devices comprise:

a CCD image sensor that outputs a single type of image signal.

20. The CCD image sensor according to claim 1, wherein said signal charges received at different timings from one another are controlled by at least two dual-phase driving signals.

* * * * *